US012806454B2

(12) United States Patent
Fayle et al.

(10) Patent No.: US 12,806,454 B2
(45) Date of Patent: Nov. 24, 2026

(54) HARNESS COMPONENT

(71) Applicant: Amer Sports Canada Inc., North Vancouver (CA)

(72) Inventors: Thomas W. C. Fayle, North Vancouver (CA); Jason Jeremy Mah, Vancouver (CA); Daniel White Jackson, Vancouver (CA); Michael L. Foley, Vancouver (CA); Cameron A. Stuart, Garibaldi Highlands (CA); Christopher R. Hodgetts, Squamish (CA); Katherine A. Mah, Denver, CO (US); William Parks, Richmond (CA)

(73) Assignee: Amer Sports Canada INC., North Vancouver (CA)

( * ) Notice: Subject to any disclaimer, the term of this patent is extended or adjusted under 35 U.S.C. 154(b) by 380 days.

(21) Appl. No.: 18/429,795

(22) Filed: Feb. 1, 2024

(65) Prior Publication Data

US 2025/0249298 A1 Aug. 7, 2025

(51) Int. Cl.
*A62B 35/00* (2006.01)

(52) U.S. Cl.
CPC ................................ *A62B 35/0025* (2013.01)

(58) Field of Classification Search
CPC ............ A62B 35/0025; A62B 35/0006; A62B 35/0012; A41F 9/002
USPC .............................................................. 2/311
See application file for complete search history.

(56) References Cited

U.S. PATENT DOCUMENTS

| | | | |
|---|---|---|---|
| 3,263,289 | A | 8/1966 | LaGarde |
| 3,450,810 | A | 6/1969 | LaGarde |
| 4,121,688 | A | 10/1978 | Lirakis |
| 4,632,217 | A | 12/1986 | Markwell et al. |
| 4,687,074 | A | 8/1987 | Green |
| 4,712,513 | A | 12/1987 | Huppertsberg |
| 5,145,027 | A | 9/1992 | Petzl et al. |
| 5,433,289 | A | 7/1995 | O'rourke |
| 5,487,444 | A | 1/1996 | Dennington |
| 5,615,750 | A | 4/1997 | Phillips |
| 5,957,091 | A | 9/1999 | McDonald et al. |
| 5,988,315 | A | 11/1999 | Crane |
| 6,283,248 | B1 | 9/2001 | Groover |
| 6,367,582 | B1 | 4/2002 | Derby |
| 6,431,313 | B1 | 8/2002 | Petzl et al. |
| 6,874,596 | B2 | 4/2005 | Zeissler et al. |
| 7,445,085 | B2 | 11/2008 | Petzl et al. |

(Continued)

FOREIGN PATENT DOCUMENTS

| | | |
|---|---|---|
| EP | 3006089 | 4/2016 |
| EP | 3111998 | 1/2017 |

(Continued)

*Primary Examiner* — Haley A Smith
(74) *Attorney, Agent, or Firm* — Terence P. O'Brien; Todd A. Rather

(57) ABSTRACT

A harness component may include a wide band portion and a narrow extension portion. The wide band portion may include a sleeve and a shape retainer. The sleeve has longitudinal tension lines and elastic binding lines transversely extending across the longitudinally extending lines. The shape retainer is connected to the sleeve and retains at least portions of the sleeve in a stretched and flattened state. The narrow extension portion extends from the wideband portion and includes tension lines that are connected to the longitudinal tension lines of the sleeve.

20 Claims, 22 Drawing Sheets

(56) References Cited

U.S. PATENT DOCUMENTS

| | | | | |
|---|---|---|---|---|
| 7,490,510 | B2 | 2/2009 | Agami et al. | |
| 7,490,610 | B2 | 2/2009 | Franklin | |
| 7,743,885 | B2 | 6/2010 | Martin et al. | |
| 8,025,192 | B2 | 9/2011 | Petzl et al. | |
| 8,292,029 | B2 * | 10/2012 | Martin | A62B 35/0037 182/7 |
| 8,333,262 | B1 | 12/2012 | Carpenter et al. | |
| 9,003,617 | B2 | 4/2015 | Walker et al. | |
| 10,143,865 | B2 | 12/2018 | Franke et al. | |
| 10,143,965 | B1 | 12/2018 | Gunugunuri et al. | |
| 10,646,025 | B2 | 5/2020 | Koren | |
| 10,933,260 | B2 * | 3/2021 | Nance | A62B 35/0012 |
| 11,311,755 | B2 * | 4/2022 | Blondeau | A62B 35/0031 |
| 2007/0209869 | A1 * | 9/2007 | Martin | D03D 15/587 182/6 |
| 2008/0229558 | A1 | 9/2008 | Martin | |
| 2009/0026012 | A1 * | 1/2009 | Petzl | A62B 35/0025 182/6 |
| 2011/0284321 | A1 | 11/2011 | Hall et al. | |
| 2016/0044975 | A1 | 2/2016 | Linden et al. | |
| 2016/0096044 | A1 | 4/2016 | Franke et al. | |
| 2016/0344437 | A1 | 11/2016 | Gordon | |
| 2017/0074351 | A1 | 3/2017 | Benavidez et al. | |
| 2018/0289084 | A1 | 10/2018 | Li | |
| 2020/0009411 | A1 | 1/2020 | Antonio | |
| 2020/0108294 | A1 | 4/2020 | Nance et al. | |
| 2021/0023400 | A1 | 1/2021 | Musakaev | |
| 2021/0038929 | A1 | 2/2021 | Vitt et al. | |
| 2021/0178200 | A1 | 6/2021 | Power II et al. | |
| 2025/0249297 | A1 * | 8/2025 | Fayle | A62B 35/0012 |
| 2025/0249298 | A1 * | 8/2025 | Fayle | A62B 35/0025 |
| 2025/0250724 | A1 * | 8/2025 | Fayle | D03D 15/56 |

FOREIGN PATENT DOCUMENTS

| | | |
|---|---|---|
| GB | 2283935 | 5/1995 |
| WO | WO9111318 | 8/1991 |

* cited by examiner 1672
1673
1674
1670

175
1721
1730

1821
1736

1921

2040
2021

HARNESS COMPONENT

BACKGROUND

Harnesses may have a variety of different sizes, shapes and configurations. Harnesses may be used for positioning, suspension and fall protection. Harnesses may be used for activities such as climbing, rappelling, zip lining, bungee jumping and hunting or wildlife observation. During hunting (or wildlife observation) the hunter may use a harness to suspend himself or herself from a tree or other supporting structure.

Harnesses may comprise an assembly of multiple components. Such components may include a swami and leg loops. The swami is in the form of a belt or loop that wraps around the waist of the person wearing the harness. The leg loops are connected to the swami and receive the thighs of the person wearing the harness.

In many circumstances, such harnesses are utilized in remote and possibly difficult to access geographic locations. As a result, the harness must be packed and transported. In such circumstances, it may be important for the harness to be lightweight and compact for packing and transporting.

BRIEF DESCRIPTION OF THE DRAWINGS

FIG. 53 is a front view illustrating the base harness component of

FIG. 52 overlying an example wrapping panel.

Figure 1A:
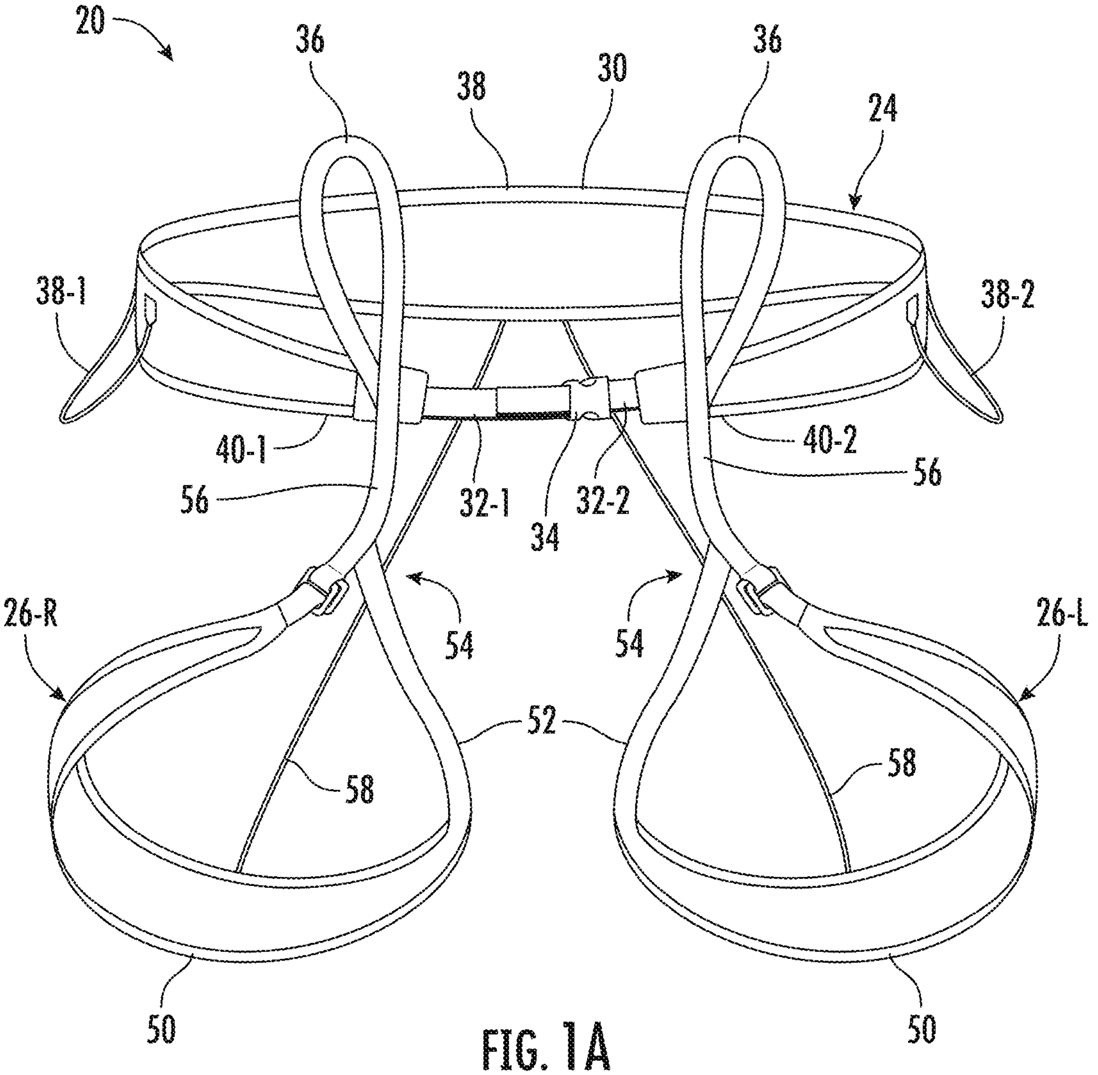
FIG. 1A is a perspective view illustrating portions of an example harness formed from various harness components.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example harnesses that may be lighter in weight and more compact for packing and transporting. Disclosed are example harnesses that may be lighter and more compact without sacrificing strength and performance. The example harnesses have constructions that facilitate the use of materials that are lighter in weight and/or thinner and more compact, while maintaining or enhancing their load capacity.

Disclosed are example harness components, such as a waist belt and leg loops, wherein the components comprise a wide band portion and narrow extension portions that are joined to opposite longitudinal ends of the wide band portion. The wide band portion provides a large surface area against the anatomy of the person wearing the harness to reduce pinching and increase comfort. The narrow extension portion extends from the wide band portion and provides a more compact, flexible and twistable length for the component to facilitate closure of the component and/or connection of the component to other components. The narrow extension portions comprise continuous longitudinally extending tension lines (in the form of longitudinally extending fibers, cords, yarns, filaments, threads or the like) that splay or spread apart at a junction with wide band portion to form first and second splayed end portions that spread across and are integral with or connected to a majority of a transverse width of the wide band. When the component is placed in tension, such tension forces are spread or distributed across at least a majority of the transverse width of the wide band, rather than being condensed along a width corresponding to width of the narrower extension portions. As result, the wide band portion is more comfortable to wear when in a state of tension and the wide band portion may be formed from lighter weight and more collapsible or packable materials.

The first and second splayed end portions are longitudinally spaced and nonoverlapping with the wideband portion longitudinally bridging between longitudinally spaced terminal ends of the first splayed end portions and the second splayed end portions. Because the first and second splayed end portions do not longitudinally overlap one another, leaving a longitudinal space between the terminal ends of the first splayed end portions and the terminal ends of the second splayed end portions, the weight of the component may be reduced. Because such longitudinally intermediate portions of the wide band portion are not overlaid with the tension lines from the narrow extension portions, such intermediate portions may be thinner and more flexible, increasing the compactness and packability of the component. Because connections, such as stitching, between the first and second splayed end portions and the wide band portion are not required across the entire longitudinal extent of the wide band portion, manufacturing cost and complexity is reduced.

In some implementations, the wide band portion comprises longitudinally extending second tension lines, wherein the tension lines of the narrow extension portion and the second tension lines of the wide band portion are each integrally formed as a single unitary body. In other words, the tension lines of the narrow extension portion continuously extend through or as part of both of the wide band portion and the narrow extension portion of the component. In some implementations, a tubular braid forms both the wide band portion and the narrow extension portion, wherein the tubular braid is flattened or spread apart to form the wide band portion. In some implementations, the portion of tension lines forming the tension lines of the narrow extension portion are contained within a tubular braid while the portion of the tension lines forming the second tension lines of the wide band portion are supported and spaced apart by a layer. For example, a layer of material may be fused, laminated, bonded or stitched to the second tension lines. In some implementations, the wide band portion may comprise a fabric or grid joined to the second tension lines.

In some implementations, the wide band has second tension lines, and the tension lines of the narrow extension portion has splayed end portions that are connected to the second tension lines of the wide band portion. In such implementations, the splayed end portions may spread apart so as to cover a majority of a transverse width of the wide band portion. In some implementations, the splayed end portions may be fused, bonded or otherwise joined to the second tension lines of the wide band portion. In some implementations, a stitch pattern (sewing) may be used to connect the splayed end portions (directly or indirectly) to the second tension lines. The stitch pattern may extend across and over the splayed end portions and the second tension lines while extending into a layer (fabric or otherwise) that supports and that is affixed to the second tension lines.

In some implementations, the wide band portion may comprise a folded panel or a pair of panels secured to one another. In some implementations, the wide band portion may comprise a first folded panel and a second folded panel, wherein a stitch pattern extends over and across the splayed ends and the second tension lines in at least one of the first folded panel and the second folded panel and wherein the stitch pattern extends into the first folded panel and the second folded panel. In some implementations, the stitch pattern may extend along opposite ends of the wide band portion, being omitted in a central portion of the wide band portion. In such implementations, the first folded panel and the second folded panel may comprise strips of fabric, wherein the second tension lines comprise warp lines (warp yarns). In such implementations, the first folded panel and the second folded panel are inter-folded such that the second folded panel is folded about and receives an edge of the first folded panel opposite its fold line. In some implementations, the first folded panel and the second folded panel are formed from a fabric having a bias such that the panels, when folded and joined to one another, lay flat.

In some implementations of each of the example harness components described herein, the harness components are dimensions and formed from materials so as to satisfy Standard EN12277-2018, Mountaineering Equipment—Harnesses—Safety Requirements and Test Methods.

FIG. 1 illustrates an example harness 20. Harness 20 comprises three primary components: a waist belt 24 (sometimes referred to as a "swami") and a pair of leg loops 26-R and 26-L (collectively referred to as leg loops 26). In some implementations, harness 20 may comprise additional primary components that encircle or wrap about the shoulders and/or chest of the person wearing harness 20. Waist belt 24 is configured to support leg loops 26 from the waist of a person wearing harness 20. Waist belt 24 is further configured to be attached to a tether, rope, cable or other flexible line from which waist belt 24 may be suspended from an upper support to limit an extent to which waist belt 24 and the person wearing harness 20 may fall from the upper support. Waist belt 24 comprises wide band portion 30, narrow extension portions 32-1, 32-2 (collectively referred to as narrow extension portions 32), connector 34, tether support line connectors 36 and gear loops 38-1, 38-2 (collectively referred to as gear loops 38).

Wide band portion 30 comprises an elongate band configured to wrap about the waste of the person wearing harness 20. Wide band portion 30 has a width so as to distribute forces along a larger surface area (as compared to a single straight line) to providing enhanced comfort to the person wearing harness 20. Wide band portion 30 has a nonuniform width along its length, being wider along a rear portion 38 and narrower along front-end portions 40-1, 40-2. In some implementations, wide band portion 30 is configured to rest upon the iliac crest of a person's hip bones. In such implementations, wide band portion 30 may have a curved configuration similar to that of a banana.

Narrow extension portions 32-1 and 32-2 extend from front end portions 40-140-2, respectively, of waist band portion 30. Narrow extension portions 32 each have a width less than that of rear portion 38 and, in the example illustrated, less than at least portions of front-end portions 40. In the example illustrated, narrow extension portions 32 comprise straps that are each joined to connector 34. In the example illustrated in which connector 34 comprises a buckle or pair rungs, wherein at least one of narrow extension portions 32 is configured to thread through the rungs or the buckle to provide an adjustable length for waist belt 38.

Connector 34 releasably connects narrow extension portions 32 to secure waist belt 24 about the waist of the person wearing harness 20. In the example illustrated, connector 34 comprises a quick disconnect connector in the form of a side release buckle. In the example illustrated, the side release buckle is joined to narrow extension portions 32-1 to provide narrow extension portions 32-1 with an adjustable length extending between front-end portions 40-1 and connector 34. In other implementations, narrow extension portions 32-1 may be joined to connector 34 with a fixed length between end portions 40-1 and connector 34. In yet other implementations, connector 34 may comprise other forms of a connector.

Tether support line connector 36, sometimes referred to as a belay loop provides a connection point for a tether support line, in the form of a rope, cable, strap or the like configured to be suspended from an upper support. In the example illustrated, tether support line connector 36 comprises the two loops formed by upper end portions of the narrow extension portions 56 of the leg loops 26, wherein the tether support line is "tied into" the two loops. In some implementations, such loops may be formed from materials such as nylon, polyester, ultra-high molecular weight yarns, liquid crystal polymers such as VECTRAN, or other fibers.

Gear loops 38 comprise loops extending from wide band portion 30. Gear loops 38 are configured to be attached to various pieces of gear that may be hung from waist belt 24. In the example illustrated, each of gear loops 38 comprises a flexible cord having opposite ends secured to sides of wide band portion 30. In other implementations, gear loops 38 may be formed by metal loops or metal rings secured to wide band portion 30. In some implementations, gear loops 38 may have other configurations and may be secured to different portions of wide band portion 30. In some implementations, waist belt 24 may include additional gear loops 38 or may omit gear loops 38.

Leg loops 26-R and 26-L extend from and are suspended from the right and left front sides, respectively, of waist belt 24. Leg loops 26-R and 26-L are configured to be wrapped about the right and left thighs, respectively, of the person wearing harness 20. Leg loops 26 are substantially identical to one another. Leg loops 26 each comprise wide band portion 50, narrow extension portion 52, connector 54, narrow extension portion 56 and leg loop riser 58.

Wide band portion 50 comprises a wide band configured to underlie a person's thighs while spreading or distributing forces across a wider surface area to provide enhanced comfort to the thighs of the person wearing harness 20. Wide band portion 50 has a nonuniform width along its length, tapering as it approaches each of narrow extension portions 52 and 56. In such implementations, wide band portion 50 may have a curved configuration similar to that of a banana. Wide band portion has a minimum widest width of 43 mm when used as part of a waist belt and a minimum widest width of 43 mm when employed as part of a leg loop.

Narrow extension portion 52 extends from wide band portion 50 so as to extend along an inner thigh of the person wearing harness 20. Narrow extension portion 52 provides a length that may be more flexible, bendable or twistable as compared to wide band portion 50. In the example illustrated, narrow extension portion 52 has a maximum transverse width that is no greater than 75% to of the maximum transverse width of wide band portion 50. As will be described hereafter, narrow extension portion 52 comprises continuous longitudinally extending tension lines (in the form of fibers, yarns, threads or the like) that are condensed or packed, but which spread or splay apart at a juncture with wide band portion 50. When leg loops 26 are placed in tension, such tension forces are spread or distributed across at least a majority of the transverse width of the wide band portions 50, rather than being condensed along a width corresponding to width of the narrower extension portions 52. As result, the wide band portion 50 are more comfortable to wear when in a state of tension and the wide band portions 50 may be formed from lighter weight and more collapsible or packable materials.

Connector 54 releasably connects an end of narrow extension portion 52 to narrow extension portion 56 so as to complete the loop about the person's thigh. In the example illustrated, connector 54 comprises an enlarged head 62 joined to narrow extension portion 52 and a ring or loop 64 joined to narrow extension portion 56. Head 62 is received and captured by loop 64. In the example illustrated, narrow extension portion 52 is wrapped through head 62 and is adjustable. In the example illustrated, loop 64 is formed by a flexible band of material wrapped about narrow extension portion 56. In such implementations, the flexible band may slide along the length of narrow extension portion 56 to provide further adjustability for the size of the leg loops 26 to accommodate differently sized thighs.

In other implementations, connector 54 may comprise a buckle, a quick disconnect or other connection mechanism that facilitates the adjustment of the length of narrow extension portion 52 between wide band portion 50 and narrow extension portion 56. In some implementations, connector 54 may affix an end of narrow extension portion 52 to narrow extension portion 56. In each of such implementations, narrow tension portion 52 may alternatively be adjustably or non-adjustably connected to an end portion of wide band portion 50.

Narrow extension portion 56 extends from wide band portion 50 and is joined or connected to waistband 24. In some implementations, narrow extension portion 56 is connected to waist belt 24 by stitching. In some implementations, narrow extension portion 56 is releasably connected to waist belt 38, such as with a carabiner attached to a ring supported by waist belt 38. In other implementations, narrow extension portion 56 is connected to waist belt 38 in other fashions.

Narrow extension portion 56 provides a length that may be more flexible, bendable or twistable as compared to wide band portion 50. In the example illustrated, narrow extension portion 52 has a maximum transverse width that is no greater than 75% of the maximum transverse width of wide band portion 50. As will be described hereafter, narrow extension portion 52 comprises continuous longitudinally extending tension lines (in the form of fibers, yarns, threads or the like) that are condensed or packed, but which spread or splay apart at a juncture with wide band portion 50. When leg loops 26 are placed in tension, such tension forces are spread or distributed across at least a majority of the transverse width of the wide band portions 50, rather than being condensed along a width corresponding to width of the narrower extension portions 56. As result, the wide band portions 50 are more comfortable to wear when in a state of tension and the wide band portions 50 may be formed from lighter weight and more collapsible or packable materials.

Leg loop risers 58 comprises straps, cords or the like which each have a first end connected to an underside of respective leg loops 26 (the underside of wide band portion 50), and a second end connected to a rear of waist belt 24 (rear portion 38 of wide band portion 30). Leg loop risers 38 assist in supporting and suspending leg loops 26 from waist belt 24.

Figure 1B:
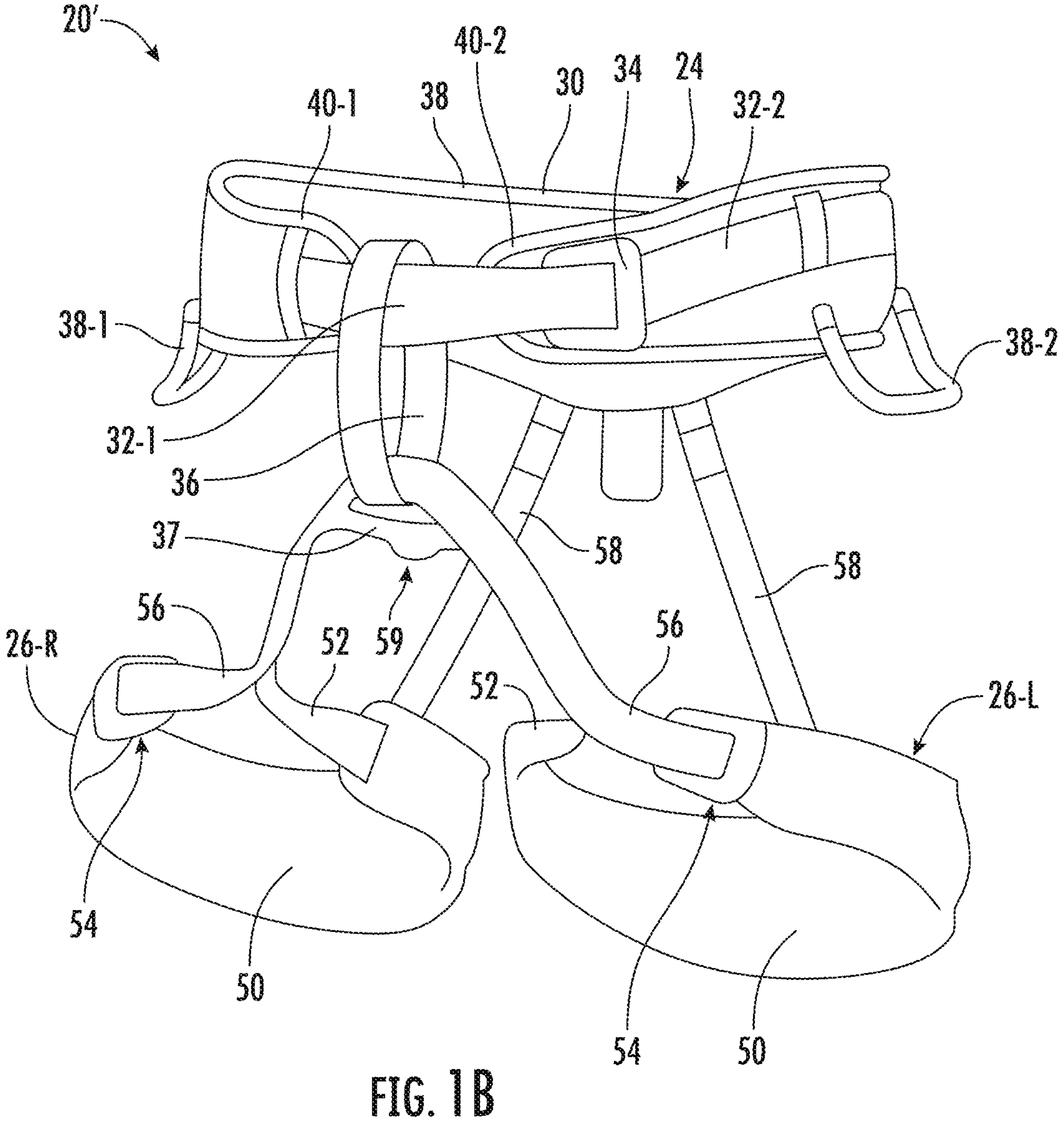
FIG. 1B is a perspective view illustrating portions of an example harness formed from various harness components.

FIG. 1B is a perspective view harness 20', a variation upon the harness 20 shown in FIG. 1A. Harness 20' is similar to harness 20 except that narrow extension portions 56 of leg loops 26 to one another (or are part of a single integral strap, band, court or the like) that passes through tether support line connector 36 (belay loop 36). Each of narrow extension portions 56 is further interconnected by a cross piece 37 to form a tie-in point or loop 59. Those remaining components of harness 20' that correspond to similar components of harness 20 are numbered similarly.

Figure 2:
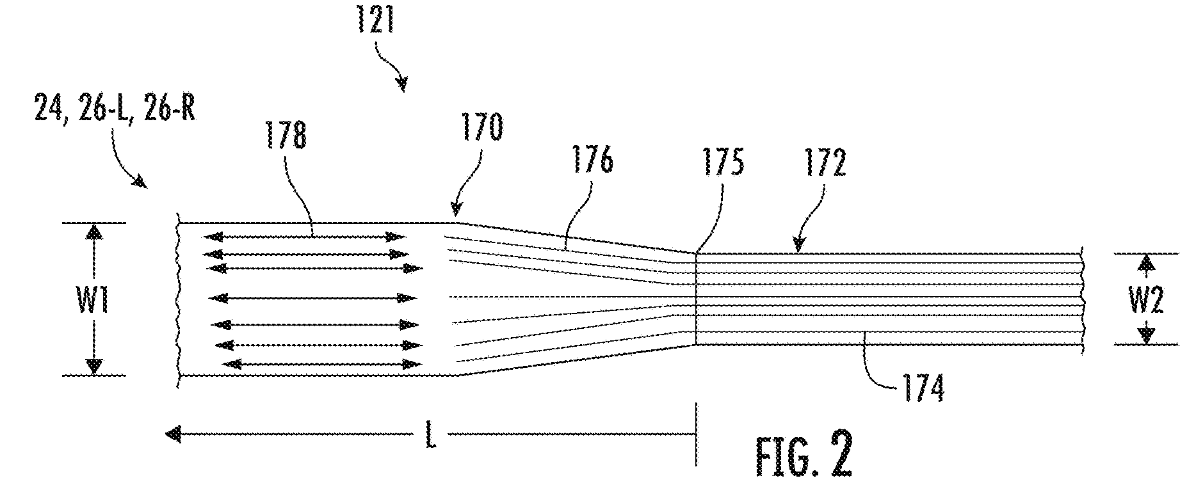
FIG. 2 is a diagram schematically illustrating portions of an example harness component of the harness of FIG. 1.

FIG. 2 is a diagram schematically illustrating portions of an example harness component 121 comprising a junction of an example wide band portion 170 and an example narrow extension portion 172. Wide band portion 170 is an example of one implementation of wide band portion 30 or wide band portion 50 of harness 20. Narrow extension 172 is an example of one implementation of narrow extension portions 32, narrow extension portions 52 and/or narrow extension portions 56 of harness 20. As shown by FIG. 2, wide band portion 170 has a longitudinal length L (the left end of which is not shown) and a maximum transverse width W1. In some implementations, wide band portion 170 comprises a single panel of one or more materials. In some implementations, wide band portion 170 comprises multiple panels bonded, stitched or laminated together. In some implementations, wide band portion 170 comprises a single folded panel folded along one or more fold lines or multiple folded panels which overlap with one another, or which are interfolded with one another.

Narrow extension portion 172 is joined to a longitudinal end of wide band portion 170. In the example illustrated, narrow extension portion 172 is joined to a tapered end of wide band portion 170. Narrow extension portion 172 has a transverse width W-2 (which may be a diameter in the case of a tube or cord) that is less than the maximum width W1 of wide band portion 170.

As further shown by FIG. 2, narrow extension portion 172 comprises a series of tension lines 174 longitudinally extending along narrow extension portion 172. Such tension lines 174 may be in the form of yarns, threads, fibers or other continuous elongate elastic or inelastic lines that may transmit tensile forces. Each of such tension lines 174 have splayed end portions 176 that continue beyond the end 175 of narrow extension portion 172 and that splay or spread apart across a majority of the transverse width W1 of wide band portion 170. The splayed end portions 176 may be held in their spaced locations by being affixed or secured to wide band portion 170.

Because the splayed end portion 176 transversely spans across a majority of the width W1 of wide band portion 170 and because the splayed end portion 176 spans across a transverse width that is greater than the transverse width W-2 of narrow extension portion 172, the longitudinal tensile forces, represented by arrows 178 that occur when the component is placed in tension, are spread or distributed across at least a majority of the transverse width W1 of the wide band 170, rather than being condensed along a width corresponding to width W-2 of the narrower extension portion 172. As result, the wide band portion 170 is more comfortable to wear when in a state of tension and the wide band portion 170 may be formed from lighter weight and more collapsible or packable materials.

Figure 3:
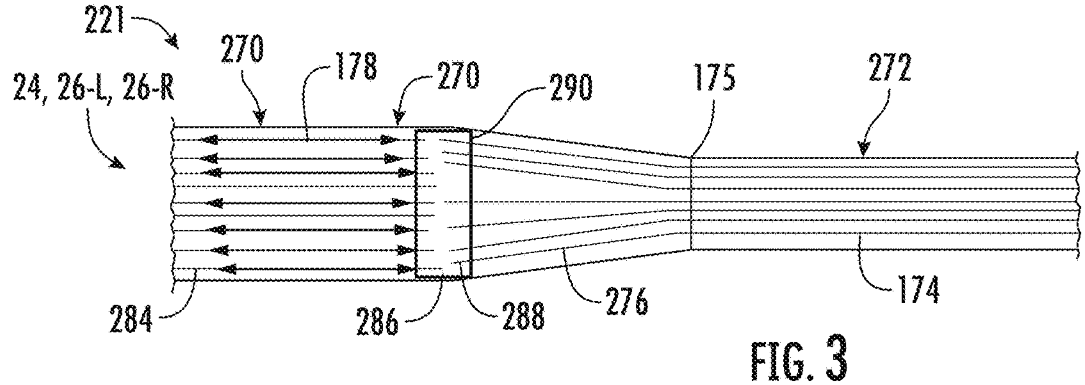
FIG. 3 is a diagram schematically illustrating portions of an example harness component of the example harness of FIG. 1.

FIG. 3 is a diagram schematically illustrating portions of an example harness component 221, comprising a junction of an example wide band portion 270 and an example narrow extension portion 272. Wide band portion 270 is an example of one implementation of wide band portion 30 or wide band portion 50 of harness 20. Narrow extension portion 272 is an example of one implementation of narrow extension portions 32, narrow extension portions 52 and/or extension portions 56 of harness 20.

Wide band portion 270 is similar to wide band portion 170 described above except that wide band portion 270 is specifically disclosed as comprising tension lines 284 that continuously and longitudinally extend along the length of wide band portion 270. Tension lines 284 may be in the form of yarns, threads, fibers or other continuous elongate elastic or inelastic lines that may transmit tensile forces. Tension lines 284 have terminal ends 286.

Narrow extension portion 272 is similar to narrow extension portion 172 described above except that tension lines 174 of narrow extension portion 272 have splayed end portions 276 that terminate at ends 288 proximate to ends 286 of tension lines 284. As with splayed end portions 176, splayed end portions 276 continue beyond the end 175 of narrow extension portion 272 and splay or spread apart across a majority of the transverse width W1 of wide band portion 170. The splayed end portions 176 may be held in their spaced locations by being affixed or secured to wide band portion 170.

As shown in FIG. 3, the harness component 24, 26-L, 26-R formed by wide band portion 270 and narrow extension portion 272 additionally comprises a tension connector 290 (schematically illustrated). Tension connector 290 bridges across, bridges between or otherwise physically couples end portions 284 and 276 such that the longitudinal forces or tension (represented by arrows 178) may be transmitted between end portions 284 and 276. Tension connector 290 facilitates the transmission of tension forces from the wider spread tension lines 284, across splayed end portions 276, to the more narrowly spread or more condensed tension lines 174. In some implementations, tension connector 290 may comprise a stitch pattern that extends over and across both of tension lines 284 and splayed end portions 276 and into a supporting substrate, such as an overlying panel, an underlying panel or into a pair of panels sandwiching at least portions of the tension lines 284 and at least portions of the splayed end portion 276. In some implementations, the stitch pattern may comprise a zigzag stitch pattern. In some implementations, tension connector 290 may comprise an adhesive, a fusing or welding region or other materials for bridging between tension lines 284 and splayed end portion 276 such that tension forces are transmitted therebetween.

Figure 4:
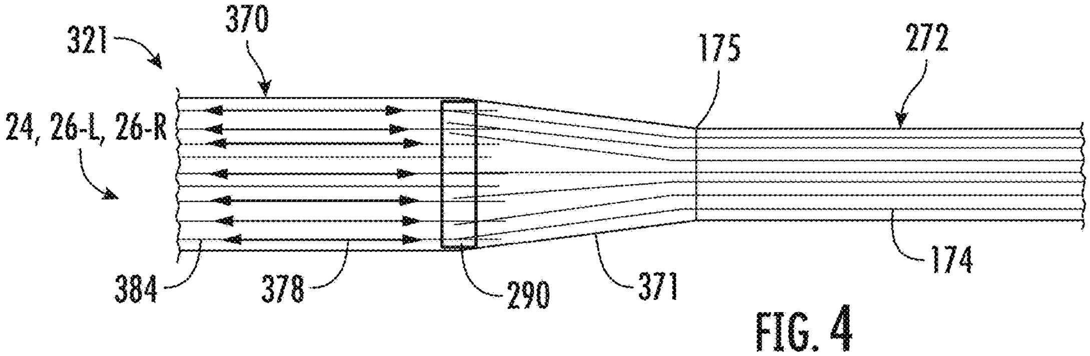
FIG. 4 is a diagram schematically illustrating portions of an example harness component of the example harness of FIG. 1.

FIG. 4 is a diagram schematically illustrating portions of an example harness component 321 comprising a junction of an example wide band portion 370 and an example narrow extension portion 272 (described above). Wide band portion 370 is an example of one implementation of wide band portion 30 or wide band portion 50 of harness 20. Narrow extension portion 272 is an example of one implementation of narrow extension portions 32, narrow extension portions 52 and/or extension portions 56 of harness 20.

Wide band portion 370 is similar to wide band portion 270 except that wide band portion 370 comprises tension lines 384 in place of tension lines 284. Tension lines 384 are similar to tension lines 284 except that tension lines 384 have a length sufficient so as to overlap and/or cross tension lines 174 in regions underlying tension connector 290. In some implementations, tension lines 384 continue along parallel axes to the edges of the tapering sides 371 of wide band portion 370. In some implementations, tension lines 384 bend and converge towards one another as they approach the junction of narrowband portion 272 and wide band portion 370 at end 175 because tension lines 174 and 34 overlap (in a longitudinal direction, the direction of tension forces 178), the transmission of tension forces from wide band portion 370 to tension lines 174 of narrow extension 272 may be enhanced.

Figure 5:
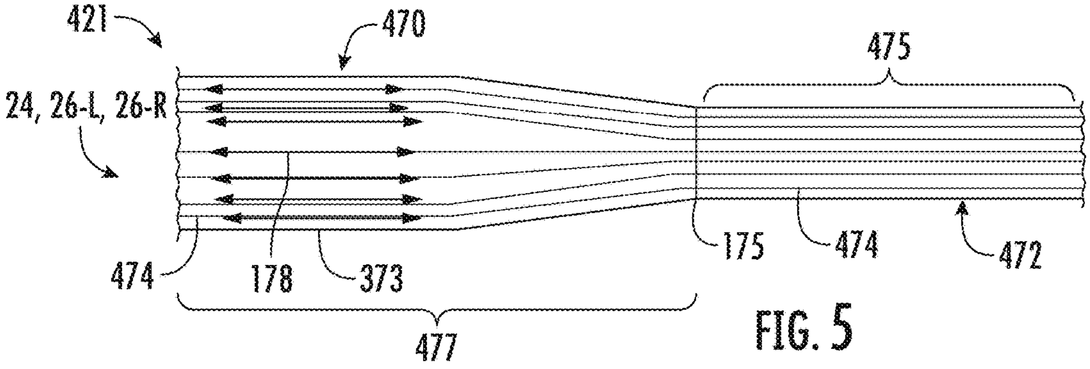
FIG. 5 is a diagram schematically illustrating portions of an example harness component of the example harness of FIG. 1.

FIG. 5 is a diagram schematically illustrating portions of an example harness component 421 at a junction of an example wide band portion 470 and an example narrow extension portion 472. Wide band portion 470 is an example of one implementation of wide band portion 30 or wide band portion 50 of harness 20. Narrow extension portion 472 is an example of one implementation of narrow extension portions 32, narrow extension portions 52 and/or extension portions 56 of harness 20.

Wide band portion 470 and narrow extension portion 472 are similar to wide band portion 370 and narrow extension portion 272 described above except that portions 470 and 472 comprise a single set of tension lines 470 that continuously, without interruption, extends along both wideband portion 470 and narrow extension portion 472. As shown by FIG. 5, tension lines 470 comprise integral, unbroken tension lines that extend across end 175 of narrow extension portion 472 and that extend parallel to one another along a majority, if not a full width of the widest portion 373 of wideband portion 470. Tension lines 474 include segments 475 that extend along narrow extension portion 474 and segments 477 that extends along wideband portion 470. Segments 475 and 477 of each of tension lines 474 comprises continuous uninterrupted lines or strands such as yarn, threads, strings, cords, cables or the like.

Segments 475 may be maintained in a closely spaced arrangement by an underlying, an overlying or at least one middle base layer to which such portions of tension lines 474 are adhered, stitched, fused or interwoven. In some implementations, segments 475 may comprise a bundle of parallel lines (parallel yarns, threads, cords or the like) that are not woven or intertwined with one another, but encased or surrounded by an outer tube, sheath or sleeve. Segments 477 may be maintained in a wider spaced arrangement, spaced across a majority of a transverse width of wideband portion 470 or across a transverse width that is greater than the transverse width of narrow extension portion 472, by an underlying, an overlying or at least one middle base layer to which segments 477 of tension lines 474 are adhered, stitched, fused or interwoven.

In some implementations, tension lines 474 may be in the form of a fabric braid or a tubular braid providing segments 475 and 477. The tubular braid make be formed by individual lines that crisscross one another and that are woven, braided or otherwise intertwined along the length of such tension lines (forming three-dimensional tension lines). In such implementations, portions of the tubular braid (segments 477) may be spread apart and held apart by a layer or other structure to form wideband portion 470. In some implementations, the tubular braid may be retained in the condensed or compact state along narrow portion 472 by an outer tube, sleeve or sheath may or may not be bonded, stitched, fused otherwise joined to the tension lines provided by the tubular braid. In some implementations, those portions of the tubular braid forming narrow extension 472 may omit any sheath or other layer, wherein segments 475 of the tension lines 474 provided by the tubular braid and forming narrow extension portion 472 are naturally drawn together when under tension, whereas those portions of the tubular braid forming wideband portion 470 are held or retained in a wider, spread configuration.

Figure 6:
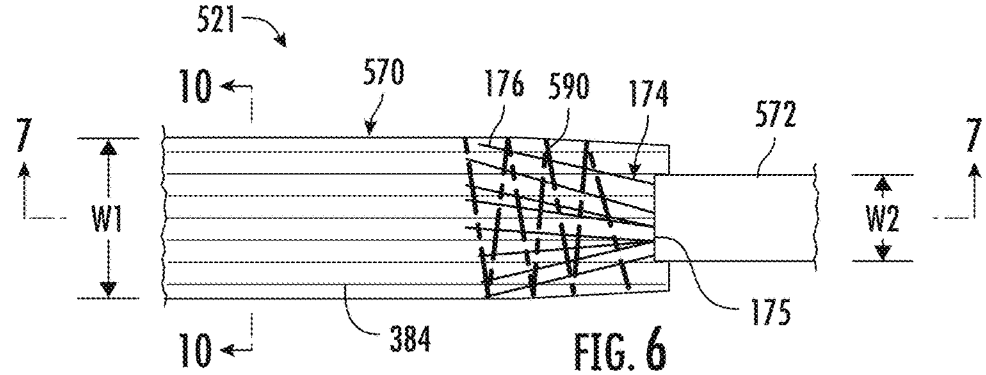
FIG. 6 diagram schematically illustrating portions of an example harness component of the example harness of FIG. 1.

FIG. 6 is a diagram schematically illustrating portions of an example harness component 521 which may serve as waist belt 24 and/or one or both of leg loops 26 described above. Harness component 521 comprises wideband portion 570 and narrow extension portion 572. Narrow extension portion is similar to narrow extension portion 172 described above. Narrow extension portion 572 has a transverse width which is less than the transverse width W1 of wideband portion 570. Narrow extension portion 572 comprises tension lines 174 extending along its longitudinal length, wherein the tension lines 174 project from the end 175 and are spread or splayed apart to form splayed end portion 176 which is joined to wideband portion 570 by tension line connector 590.

Tension line connector 590 connects splayed end portion 176 to wideband portion 570 across a majority, and in some implementations, at least 90%, of the transverse width W1 of wideband portion 570. In the example illustrated, wideband portion 570 comprises longitudinal tension lines 384. Longitudinal tension lines 384 extend parallel to one another. Although not illustrated, wideband portion 570 may comprise additional lines (yarns, threads, filaments, cords or the like) that extend perpendicular to lines 384 or at other angles relative to lines 384. In some implementations, such additional lines may be omitted.

Splayed end portion 176 and tension lines 384 overlap one another, wherein tension line connector 590 overlaps both splayed end portion 176 and tension lines 384 across a majority, in some implementations at least 90% of the transverse width W1 of wideband portion 570. In the example illustrated, tension line connector 590 is in the form of a stitch pattern. In some implementations, tension lines 384 may be omitted. For example, wideband portion 570 may comprise a layer or panel of material that omits longitudinally extending threads, yarns or the like, such as a homogenous flexible polymeric layer.

Figure 7:
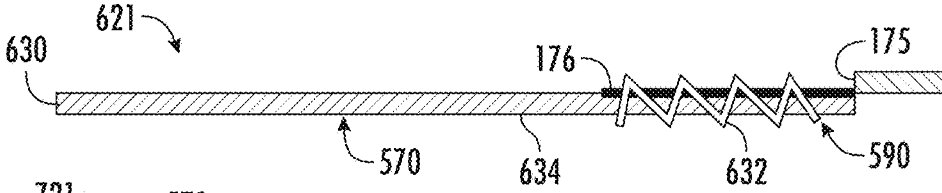
FIG. 7 is a sectional view of an example harness component of the example harness of FIG. 1 taken along line 7-7 of FIG. 6.

FIGS. 7-15 are sectional views illustrating various examples of different implementations of wideband portion 570 and tension line connector 590. FIG. 7 is a sectional view taken along line 7-7 of FIG. 6. FIG. 7 illustrates an example harness component 621, one implementation of harness component 521. As shown by FIG. 7, wideband portion 570 comprises a layer 630 of material underlying splayed end portion 176. Layer 630 comprises tension lines 384 (shown in FIG. 6).

Tension line connector 590 comprises a stitch pattern 632 that extends transversely across splayed end portion 176 (as shown in FIG. 6) and that extends through the and across splayed end portion 176 into layer 630. In one implementation, the threads of stitch pattern 632 extend completely through layer 630, across a bottom face 634 of layer 630.

Figure 8:
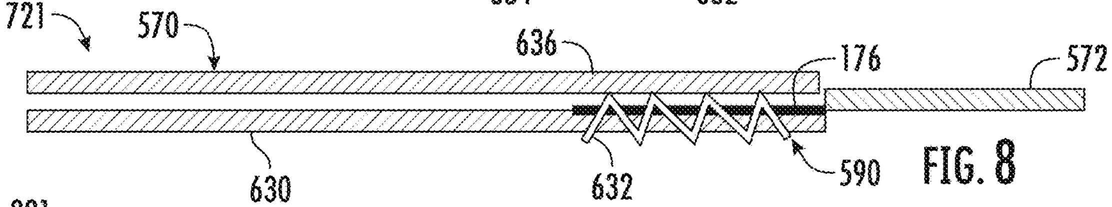
FIG. 8 is a sectional view of an example harness component of the example harness of FIG. 1 taken along line 7-7 of FIG. 6.

FIG. 8 is a sectional view taken along line 7-7 of FIG. 6. FIG. 8 illustrates an example harness component 721, one implementation of harness component 521. Harness component 721 is similar to harness component 621 except that harness component 721 additionally comprises layer 636. Layer 636 overlies layer 630 and overlies stitch pattern 632 and splayed end portion 176. Layer 636 may be formed from the same material or a different material than that of layer 630. In some implementations, layers 636 may include longitudinally extending tension lines in the form of yarn, cords, threads or the like. In some implementations, layer 66 may omit longitudinally extending tension lines, such as where layer 636 comprises a homogenous panel of a polymer. In implementations in which layer 636 is to contact the surface of the skin of the person wearing the harness using harness component 721, layer 66 may be formed from a softer or more breathable material as compared to that of layer 630. Layer 636 is secured to layer 630 so as to sandwich splayed end portion 176 between layers 630 and 636. Layer 66 may be secured to layer 630 by being adhesively bonded to layer 630, by being fused to layer 630 (such as where the surface material of layers 630 and 636 are both meltable and compatible with one another) or may be separately joined to one another by additional stitching, distinct from stitch pattern 632.

Figure 9:
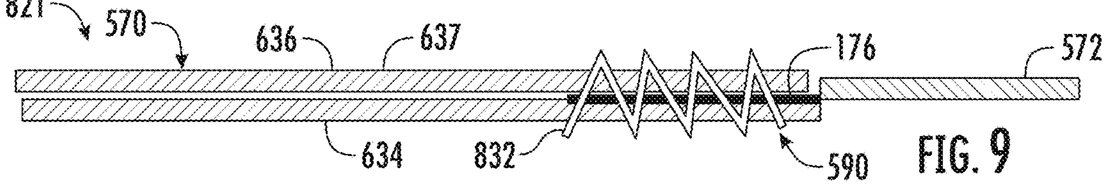
FIG. 9 is a sectional view of an example harness component of the example harness of FIG. 1 taken along line 7-7 of FIG. 6.

FIG. 9 is a sectional view taken along line 7-7 of FIG. 6. FIG. 9 illustrates an example harness component 821, one implementation of harness component 521. Harness component 821 is similar to harness component 721 except that harness component 821 comprises a tension line connector 590 in the form of stitch pattern 832. Like stitch pattern 632, stitch pattern 832 extends transversely across splayed end portion 176 (as shown in FIG. 6). Unlike stitch pattern 632, stitch pattern 832 extends through the and across splayed end portion 176 and into both layers 630 and 636. In one implementation, the threads of stitch pattern 832 extend completely through both layers 630 and 636, across a bottom face 634 of layer 630 and across a top face 637 of layer 636. In some implementations, layers 636 may be provided with longitudinally extending tension lines (similar to tension lines 384). In such implementations, because stitch pattern 832 passes across splayed end portion 176 and such additional tension lines of layer 636, enhanced tension force transmission and a stronger junction between wideband portion 570 and narrow sense portion 572 may result. As with harness component 721, layer 630 and 634 may be additionally secured to one another along their mutually facing surfaces by adhesives, welds (fusing) or additional stitching. As discussed above, in some implementations, layer 636 may be formed from material different than that of layer 634. Such layers may have different thicknesses as well.

Figure 10:
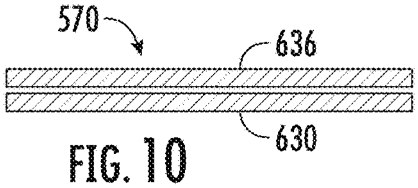
FIG. 10 is a sectional view of an example harness component of the example harness of FIG. 1 taken along line 10-10 of FIG. 6.
Figure 11:
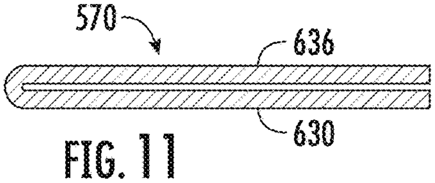
FIG. 11 is a sectional view of an example harness component of the example harness of FIG. 1 taken along line 10-10 of FIG. 6.
Figure 12:
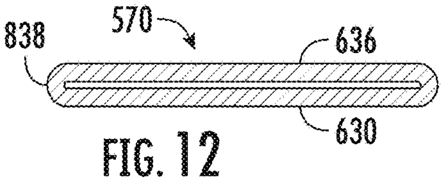
FIG. 12 is a sectional view of an example harness component of the example harness of FIG. 1 taken along line 10-10 of FIG. 6.
Figure 13:
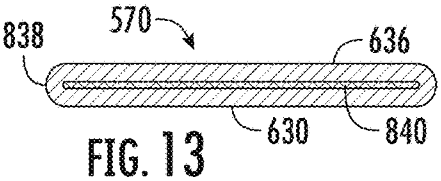
FIG. 13 is a sectional view of an example harness component of the example harness of FIG. 1 taken along line 10-10 of FIG. 6.

FIGS. 10-12 illustrate various examples of constructions for the provision of layers 630 and 636 of harness component 721 and harness component 821. FIGS. 10-12 are sectional views taken along line 10-10 of FIG. 6. As shown by FIG. 10, layers 630 and 636 may be provided by separate panels joined to one another (as discussed above) by adhesives, fusing and/or stitching. As shown by FIG. 11, layers 630 and 636 may be provided by a single panel that is folded, wherein the folded portions of the single panel are joined to one another, as discussed above, by adhesive, fusing and/or stitching. As shown by FIG. 12, layers 630 and 636 may be provided by a flattened sheet, tube or sleeve 838. As with harness component 721, layers 630 and 634 may be additionally secured to one another along their mutually facing surfaces to maintain the flattened configuration using adhesives, welds (fusing) or additional stitching. As shown by FIG. 13, in some implementations, an additional layer 840 may be inserted into or imposed within the interior of the sleeve 838 to maintain a flattened and wider configuration or wideband portion 570. In some implementations, layers 630 and 634 may be additionally secured to one another and to the intermediate layer 840 with adhesives, welds (fusing) or additional stitching.

Figure 14:
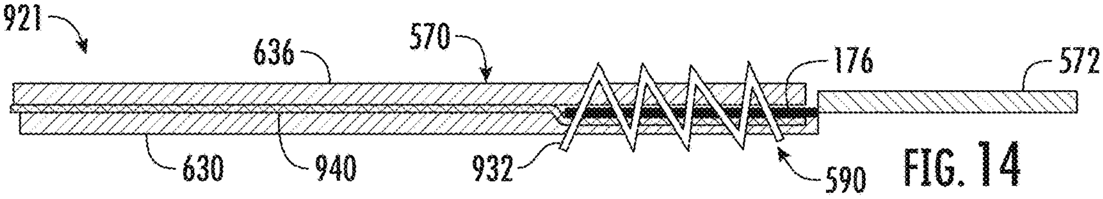
FIG. 14 is a sectional view of an example harness component of the example harness of FIG. 1 taken along line 7-7 of FIG. 6.

FIG. 14 illustrates an example harness component 921 taken along line 7-7 of FIG. 6. Harness component 921 is similar to harness component 821 except that harness component 921 comprises a middle or intermediate layer 940 sandwiched or captured between layers 630 and 636. Layer 940 further extends between splayed end portions 176 and layer 630. Harness component 921 comprises a tension line connector 590 in the form of a stitch pattern 932. Stitch pattern 922 is similar to stitch pattern 832 except that stitch pattern 922 additionally extends through layer 940. In some implementations, layer 940 may comprise a layer formed from a different material than that of layer 630 or 636. In some implementations, layer 940 may comprise an elastomeric or resiliently flexible material. In some implementations, layer 940 may comprise a compressible material, such as an open or close cell foam material. In some implementations, layer 940 is dimensioned and formed from one or more materials such that layer 940 maintains the wide shape of wideband portion 570 when component 921 is being used. Although illustrated as being thinner than layers 630 and 636, in some implementations, layer 940 may be thicker than such layers. As discussed above, layers 630 and 636 may have any of the configuration shown in FIGS. 10-13.

Figure 15:
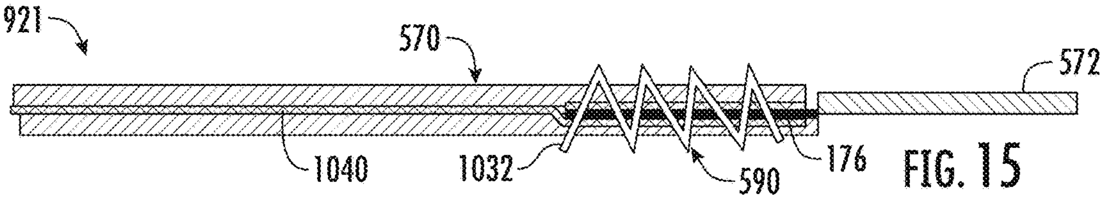
FIG. 15 is a sectional view of an example harness component of the example harness of FIG. 1 taken along line 7-7 of FIG. 6.

FIG. 15 illustrates an example harness component 1021 taken along line 7-7 of FIG. 6. Harness component 1021 is similar to harness component 921 except that harness component 1021 comprises layer 1040. Layer 1040 is similar to layer 940 except that layer 1040 extends both above and below splayed end portion 176. In some implementations, layer 1040 comprises a single integral layer. In some implementations, layer 1040 may be replaced with two separate layers or panels, one of which extends along the length of wideband portion 570 and above or below splayed end portion 176, and the other of which extends below or above splayed end portion 176. Harness 11021 comprises a tension line connector 590 in the form of a stitch pattern 1032. Stitch pattern 1032 is similar to stitch pattern 932 except that stitch pattern 1032 extends through layer 1040 both above and below splayed end portion 176.

Figure 16:
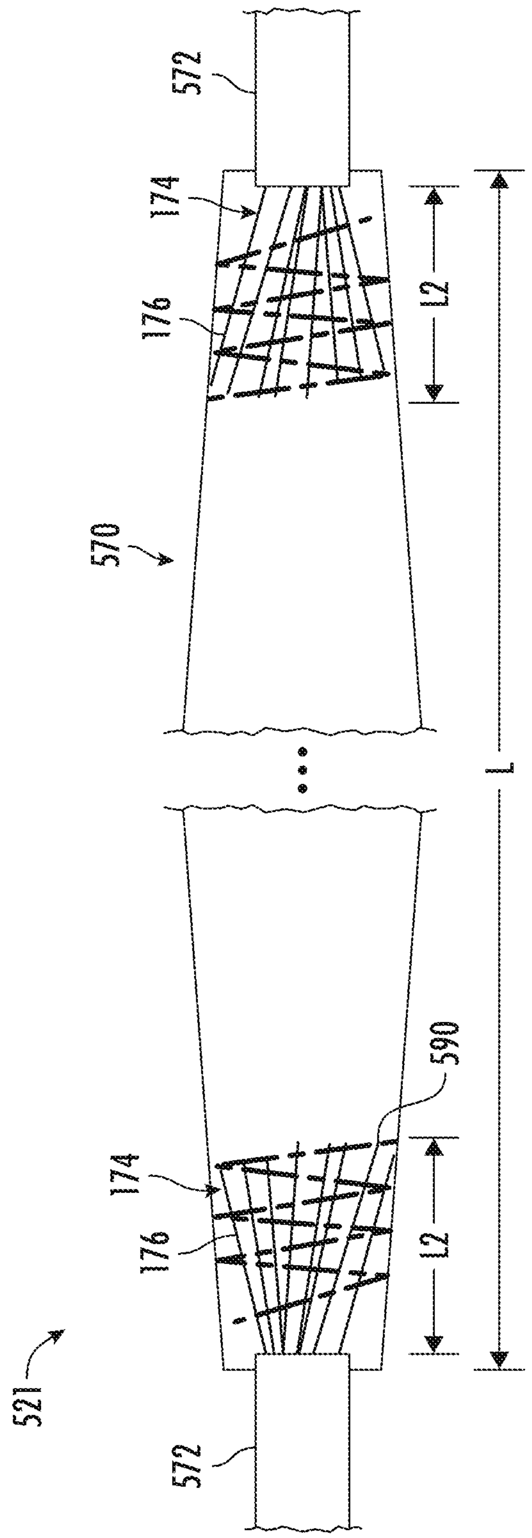
FIG. 16 is a diagram illustrating a larger portion of the example harness component of FIG. 6.

FIG. 16 is a diagram illustrating a larger portion of harness component 521 described above. As shown by FIG. 16, wideband portion 570 has a longitudinal length L extending between opposing narrow extension portions 572. As discussed above, narrow extension portions 570 have first and second splayed end portions 176-1 and 176-2 (collectively referred to as splayed end portions 176) which are joined to narrow extension portions 570 by tension line connectors 590. Each of splayed end portions 176 has a length L2 that overlaps at least 10% of the length L of wideband portion 570. As described above, harness component 521 may have any of the various constructions described above with respect to FIGS. 7-15.

As shown by FIG. 16, the first and second splayed end portions 176 are longitudinally spaced and nonoverlapping with the wideband portion 576 longitudinally bridging between longitudinally spaced terminal ends of the first splayed end portions 176 and the second splayed end portions 176. Because the first and second splayed end portions 176 do not longitudinally overlap one another, leaving a longitudinal space between the terminal ends of the first splayed end portions 176-1 and the terminal ends of the second splayed end portions 176-2, the weight of the component may be reduced. Because such longitudinally intermediate portions of the wide band portion 570 are not overlaid with the tension lines from the narrow extension portions 572, such intermediate portions may be thinner and more flexible, increasing the compactness and packability of the component. Because connections, such as stitching, between the first and second splayed end portions and the wide band portion are not required across the entire longitudinal extent of the wide band portion 570, manufacturing cost and complexity is reduced.

In the example illustrated, tension line connector 590 may be in the form of at least one stitch pattern 1132 that transversely extends across a width W that is greater than the width W2 of the narrow extension portions 572. The at least one stitch pattern 1132 may comprise a single continuous unending stitch pattern or multiple distinct or separate smaller stitch patterns. In some implementations, stitch pattern 1132 has a zigzag pattern. In other implementations, stitch pattern 1130 may have other patterns.

Harness component 521 may have any of the constructions described above with respect to FIGS. 7-15. For example, wideband portion 570 may comprise a single layer 630 similar to harness component 621. Wideband portion 570 may additionally comprise a top layer 636 overlying the splayed end portions 176 and a stitch pattern 632 similar to that of harness component 721. Similar to harness component 821, a stitch pattern 832 may extend through both layers 634 and 636 when provided. When multiple layers are provided for wideband portion 570, the wideband portion may have any the configuration shown in FIGS. 10-13. In implementations where wideband portion 570 comprises multiple layers sandwiching the splayed end portions 1176, an intermediate layer 940 or 1040 may be provided between such layers, similar to harness component 921 and 1021.

Figure 17:
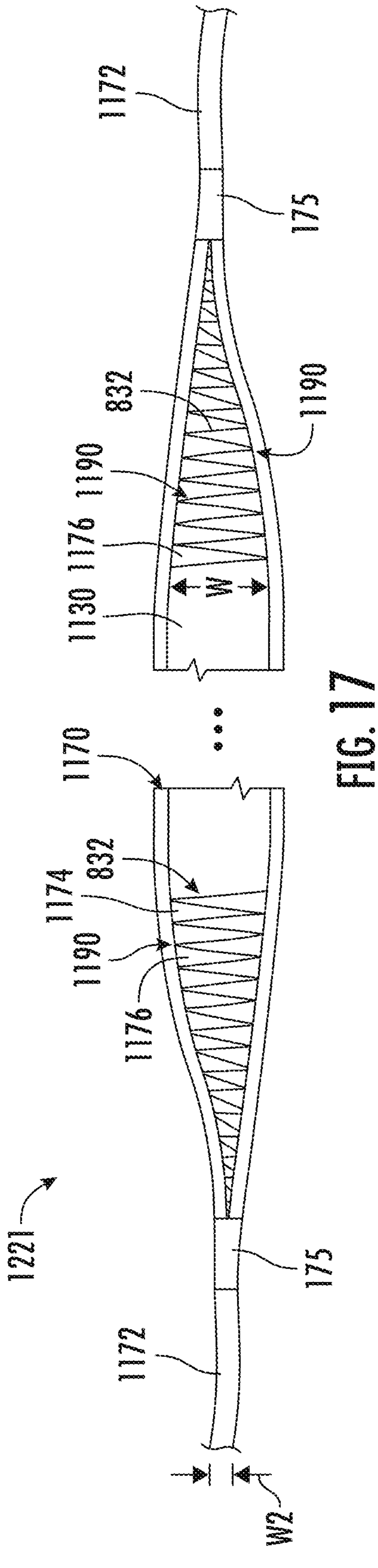
FIG. 17 is a front view illustrating an example harness component of the example harness of FIG. 1.
Figure 18:
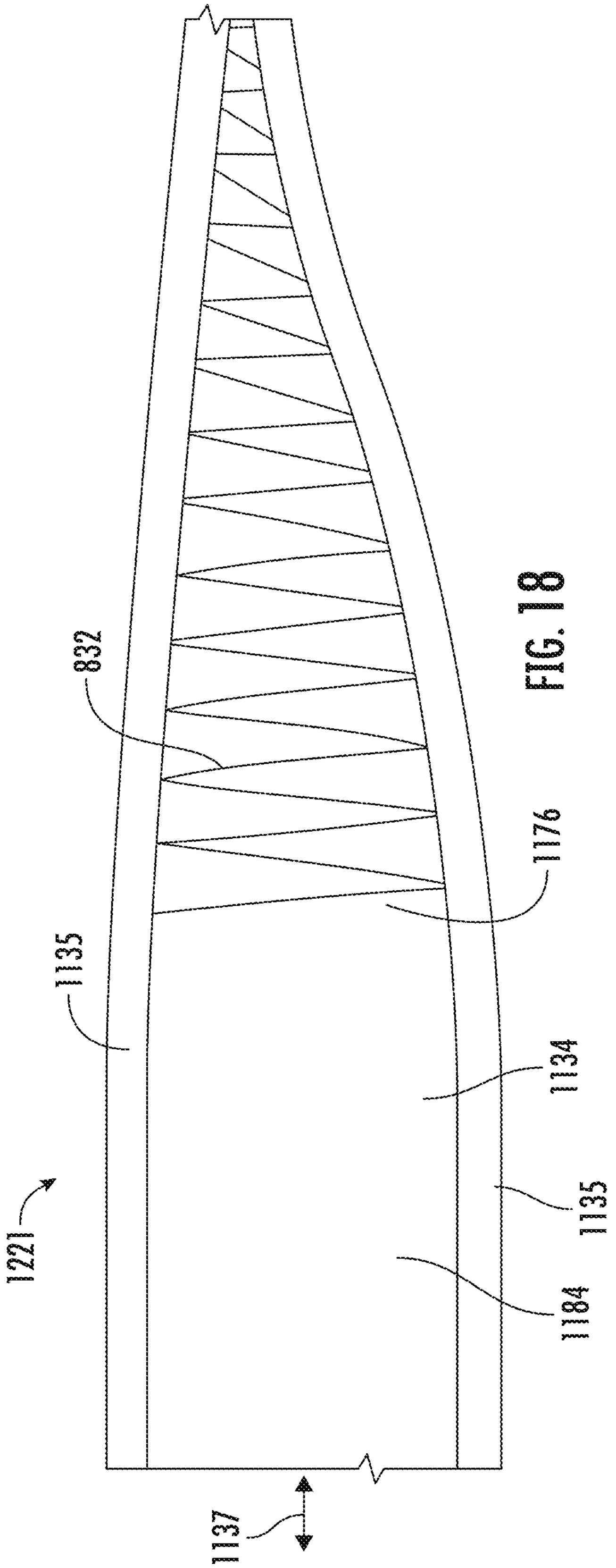
FIG. 18 is a rear view illustrating an enlarged portion of the example harness component of FIG. 17.
Figure 19:
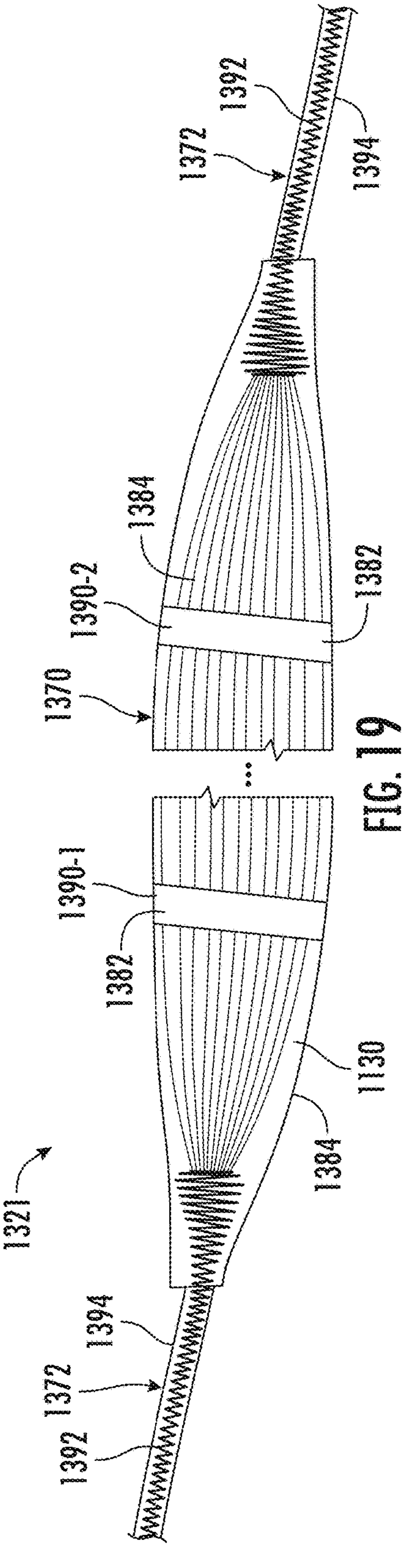
FIG. 19 is a front view illustrating an example harness component of the example harness of FIG. 1.

FIGS. 17 and 18 illustrate portions of an example harness component 1221 which may serve as waist belt 24 and/or at least one of leg loops 26 described above with respect to harness 20. FIG. 18 illustrates a substantial portion of harness component 1221 while FIG. 19 illustrates an enlarged end portion of harness component 1221. Harness component 1221 comprises wideband portion 1170, narrow extension portions 1172 and tension line connector 1190.

Narrow extension portions 1172 extend on opposite ends of wideband portion 1170. Narrow extension portions 1172 each comprise elongate tension lines 1174 which are bundled or resiliently packed until splaying or spreading apart past ends 175 to form splayed end portions 1176 and so as to have a transverse width W greater than the narrow transverse width W-2 of narrow extension portions 1172. In the example illustrated, the width W of splayed end portions 1176 is equal to or at least 90% of the transverse width of wideband portion 1170. In one example implementation, the narrow extension portions 1172 are formed from strands or lines of one or more materials such as nylon, polyester, ultra-high molecular weight yarns, liquid crystal polymers such as VECTRAN®, or other fibers. The strands or lines, prior to end 175 and prior to being spread apart past end 175 may be bound within a sheath or tube, may be interwoven or braided, or may be held together by a flexible adhesive or other bonding material.

Wideband portion1170 comprises layers 1130, 1134, and edge treatments 1135. Layers 1130 1134 are similar to layers 630 and 634 described above. Layers 1130 and 1134 sandwich splayed end portions 1176 therebetween. Layers 1130 and 1134 may have any of the constructions described above with respect to FIGS. 10-13 for layers 630 and 634. In some implementations, layers 1138 and 1134 may be secured to one another by having their mutually opposing faces adhesively bonded to one another, fused to one another, or held together by stitching. In some implementations, one of layers 1130, 1134 may be omitted.

In the example illustrated, each of layers 1130 and 1134 comprises tension lines 1184 that extend in the longitudinal direction (indicated by arrows 1137). In the example illustrated, each of layers 1130 1134 additionally comprises threads, yarns or the like that extend perpendicular to tension lines 1184 and which may be interwoven with tension lines 1184. In some implementations, a layers 1130 and 1134 each comprises an ultrahigh molecular weight polyethylene fabric. In some implementations, panel 1130 and 1134 may be formed from a fabric that is perforate, permitting airflow, providing more competent the person using harness component 1221. In other implementations, layers 1130 and 1134 may be formed from different materials. In some implementations, layer 1130 may be formed from a material different than that of layer 1134. In other implementations, wideband portion 1170 may alternatively be formed from a single layer 1130 and/or may have a construction similar to that shown above with respect to harness component 621.

Edge treatments 1135 extend on opposite transverse edges of layers 1130 and 1134. Edge treatments may comprise a flexible panel of fabric or other material folded about both of the adjacent edges of each of the layers 1130 1134, wherein the folded edge panel is maintained in a folded state by stitching, adhesives, welding and the like. Edge treatments 1135 may inhibit fraying of the edges of panels/layers 1130 and 1134. Edge treatments 1135 may further fight a smooth or comfortable edge that may bear against the anatomy of the person using the harness including harness component 1221. In some implementations, edge treatments 1135 terminate prior to reaching either of narrow extension portions 1172 such that they are disconnected from narrow extension portions 1172 and do not enhance structural integrity in the longitudinal direction across the junction of wideband portion 1170 and narrow extension portions 1172. In some implementations, edge treatments 1135 may comprise a coatings, films or prints along the edge of wideband portion 1170 which are ornamental. In some implementations edge treatments 1135 may comprise a folded over portion of layer 1184 secured by fusing, adhesives or stitching. In some implementations, edge treatment 1135 may comprise stitching patterns four and mentation and/or to inhibit fraying along the edges of layer 1134. In other implementations, edge treatment 1135 may be omitted.

Tension line connectors 1190 are each similar to tension line connector 590 of harness component 821. Each of tension line connectors 1190 may comprise a stitch pattern 832 having a transverse width equal to or greater than the width W of splayed end portions 1176. Stitch pattern 832 extends across the width of splayed end portions 1176 and extends through both layers 1130 and 1134 and the sandwiched splayed end portions 1176. As result, stitch pattern 832 couples or at least indirectly connects the tension lines 1184 of panel 1130 and 1134 two the tension lines 1174 of narrow extension portions 1172 such that tension forces are fully transmitted from across the width of wideband portion 1170 to the narrow extension portions 1172. At the same time, stitch pattern 832 assist in maintaining splayed end portion 1176 in a splayed or spread apart arrangement across the surfaces of panel 1130 and 1134. Although illustrated as a zigzag pattern, stitch pattern 832 may have other patterns so as to extend across the transverse width of splayed end portion 1176 and join a majority, if not at least 90%, of the width of splayed end portion 1176 to a majority, if not at least 90%, of the transverse width of panel 1130 and 1134 of wideband portion 1170.

Figure 20:
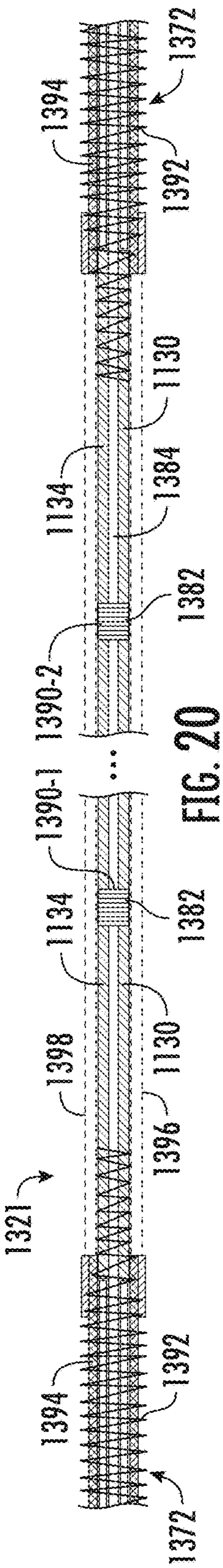
FIG. 20 is a sectional view of the example harness component of FIG. 20.

FIGS. 19 and 20 illustrate portions of an example harness component 1321 which may serve as the waist belt 24 and/or at least one of the leg loops 26 described above with respect to harness 20. Harness component 1321 comprises wideband portion 1370, narrow extension portions 1372 and tension line connectors 1390-1, 1390-2 (collectively referred to as connectors 1390).

Wideband portion 1370 and narrow extension portions 1372 share a set of continuously extending tension lines 1384 that run through and along both wideband portion 1370 and narrow extension portions 1372. Tension lines 1384 may be in the form of yarns, threads, cords, strings, elongated fibers or the like. Tension lines 1384 are bundled or compacted along narrow extension portions 1372 and are spread apart along wideband portion 1370.

Narrow extension portions 1372 each have a maximum width less than the maximum width of wideband portion 1370. Narrow extension portions 1372 are fixedly coupled to adjacent portions of tension lines 1384. In the example illustrated, narrow extension portions 1372 are fixedly coupled to adjacent portions of tension line 1384 by one or more stitch patterns 1392 which extend through and across portions of tension lines 1384 and one or more layers of narrow extension portion 1392. In the example illustrated, narrow extension portion 1392 comprises layers in the form of a sheath or tube 1394 which contains and bundles tension lines 1384. Stitch pattern 1392 extends through the tube 1394 and across tension line 1384 to securely join the tension lines 1384 to the tube 1394. In other implementations, tension line 1384 may be secured to the tube 1394 by adhesives or by fusing. In some implementations, rather than comprising tube 1394, narrow extension portions 1372 may comprise a band or strap to which the concentrated tension lines 1384 are secured by stitching, fusing or adhesives.

Wideband portion 1370 comprises a pair of layers 1130 and 1134 (described above) sandwiching the spread apart tension lines 1384 therebetween. In some implementations, the pair of layers 1130 and 1134 comprise additional tension lines longitudinally extending along the length of wideband portion 1370. In the example illustrated, layers 1130 and 1134 additionally comprise transverse yarns or tension lines. Layers 1130 and 1134 may have any of the construction described above with respect to FIGS. 10-13 with respect to layers 630 and 634, respectively. Layers 1130 and 1134 may be joined to one another by adhesives, welding, fusing or by stitching. Layers 1130 and 1134 may be joined across a majority of their mutually opposing faces or along their perimeters. In the example illustrated, stitch pattern 1392 further extends through end portions of layers 1130 and 1134, and through tension lines 1384, to join layers 1130 and 1134 at opposite ends of layers 1130 and 1134. In some implementations, layers 1130 and 1134 are formed from a material similar to the material shown forming layers 1130 and 1134 with respect to harness component 1221. In some implementations, layers 1130 and 1134 are formed from an ultrahigh molecular weight polyethylene fabric.

Tension line connectors 1390 maintain tension lines 1384 in a spread apart arrangement across the maximum width of wideband portion 1370. Tension line connectors 1390 further physically connect tension lines 1384 to the material or materials forming layers 1130 and 1134. In the example illustrated where layers 1130 and 1134 each comprise respective longitudinally extending tension lines (similar to tension lines 1184 shown in FIG. 19), tension line connectors 1390 further connect tension lines 1384 to the tension lines of layers 1130 and 1134 for additional strength.

Tension line connectors 1390 transversely extend across tension line 1384 at locations corresponding to where wideband portion 1370 and tension lines 1384 begin tapering towards the narrower extension portions 1372, connector 1390-1 of the left side and connector 1390-2 on the right side. Because tension lines 1384 do not taper and are held in spaced apart configurations at both ends, regions of tension lines 1384 between connectors 1390 remain spread apart when experiencing tension. In other implementations, tension line connectors 1390 may be replaced with a single tension line connector 1390 extending from a leftward point where tension line connectors 1384 begin tapering to the left to a rightward point where tension line connectors 1384 begin tapering to the right.

In the example illustrated, tension line connectors 1390 comprise stitching patterns 1382 that comprise stitching threads that pass through both layers 1130 and 1134 and across tension lines 1384. In other implementations, tension line connectors 1390 may comprise bands of adhesive or welds (portions where materials are fused or melted together). In some implementations, additional bands of material may be stitched to one or both sides of layers 1130, 1134 and across tension line connections 1384 to retain tension line connectors 1384 in a spread apart configuration and to join tension line connectors to layers 1130 and 1134. In some implementations, wideband portion 1370 may alternatively have a configuration similar to that shown in FIG. 8 with respect to harness component 721 where only one of the two layers is joined by tension line connectors 1390 to tension lines 1384. In some implementations, wideband portion 1370 may have a configuration similar to harness component 621 shown in FIG. 7 where layer 1134 may be omitted and where tension line connectors 1390 extend through tension lines 1384 and to the single underlying panel 1130.

As shown by broken lines in FIG. 20, in some implementations, harness component 1321 may additionally comprise one or both of the illustrated outer layers 1396, 1398. Layers 1396, 1398 may comprise layers of foam, imperforate layers, layers of softer material or padding secured to layers 1130 and 1134, respectively. Layers 1396, 1390 may be secured by additional stitching, adhesives, fusing or the like. Layers 1396, 1390 may be coated upon layers 1130 and 1134. In some implementations, layers 1396 and/or 1398 may be omitted.

Figure 21:
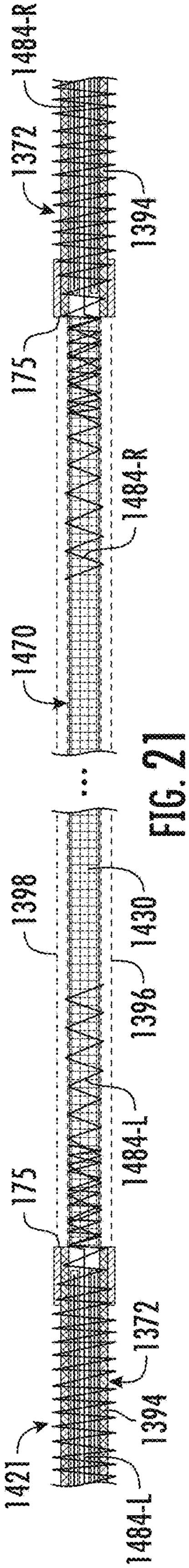
FIG. 21 is a sectional view of an example harness component of the example harness of FIG. 1.

FIG. 21 is a sectional view illustrating portions of an example harness component 1421 which may serve as waist belt 24 and/or either or both of leg loops 26 of harness 20 described above. Harness component 1421 is similar to harness component 1321 described above except that harness component 1421 comprises tension lines 1484-L and 1484-R (collectively referred to as tension lines 1484) in place of tension harness component 1421, comprises wideband portion 1470 in place of wideband portion 1370, and omits tension line connectors 1390.

In the example illustrated, wideband portion 1470 comprises at least one layer 1430 extending between ends 175 of narrower extension portions 1372. Tension lines 1484 extends from within their respective sheaths or tubes 1394, beyond ends 175. As schematically illustrated in FIG. 21, tension lines 1484 are woven into the at least one layer 1430, being threaded through the at least one layer 1430 between opposite sides of the at least one layer. In the example illustrated, the at least one layer 1430 comprises a mesh or fabric layer through which the threads, yarns or the like forming tension lines 1484 are woven. In other implementations, the least one layer 1430 comprises an otherwise imperforate layers of material, such as a polymer or other materials, through which tension lines 1484 are woven or threaded. As with harness component 1321, harness component 1421 may comprise additionally comprise layers 1396 and 1398, described above.

Figure 22:
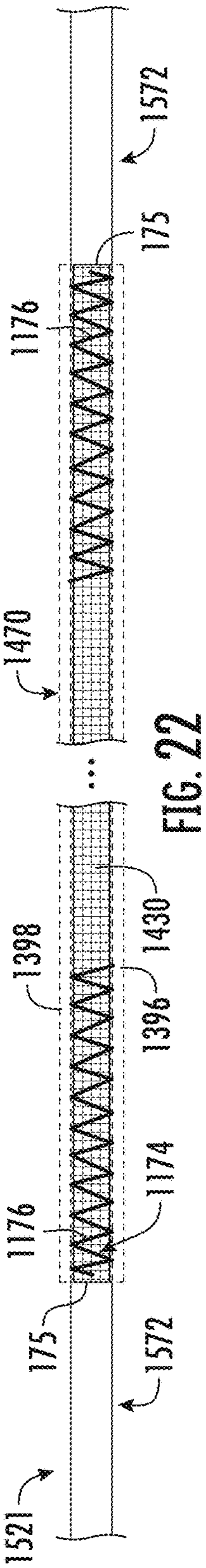
FIG. 22 is a sectional view of an example harness component of the example harness of FIG. 1.

FIG. 22 is a sectional view illustrating portions of an example harness component 1521 which may serve as waistband 24 and/or either or both of leg loops 26 of harness 20 described above. Harness component 1521 is similar to harness component 1421 except that harness component 1521 comprises narrower extension portions 1572 in place of narrower extension portions 1372 described above. Narrower extension portions 1572 may be similar to narrower extension portions 1172 described above with respect to harness component 1221. Each of narrower extension portions 1570 support tension lines 1170 which separate from an one another and which are spread apart beyond ends 175. The spread apart or splayed tension lines 1174 spread apart to form splayed end portions 1176. As shown in FIG. 17, splayed end portions 1176 are spread apart so as to have a width greater than the narrower transverse width of narrower extension portions 1572. The splayed end portions 1176 spread across a width W (shown in FIG. 17) having a that covers a majority, if not at least 90% of the transfers width of wideband portion 1470. However, rather than being maintained in a spread apart configuration and being joined to the layer of the wideband portion by tension line connectors 1190, the individual strands or tension lines 1174 forming splayed end portions 1176 are woven into and across the width of layer 1430. Such weaving retains the lines 1174 in a spread apart or splayed arrangement along the transverse width of the at least one layer 1430 and further joins the tension lines 1174 to the at least one layer 1430 for the transmission of tension forces.

The at least one layer 1430 may comprise a single layer or may comprise multiple layers having any of the configuration shown and described above with respect to FIGS. 10-13. As discussed above, harness component 1521 may additionally comprise layers 1396 and size or 1398. In some implementations, an additional layers may be interposed between layers of the at least one layer 1430.

Figures 23, 24, 25, 26, 27:
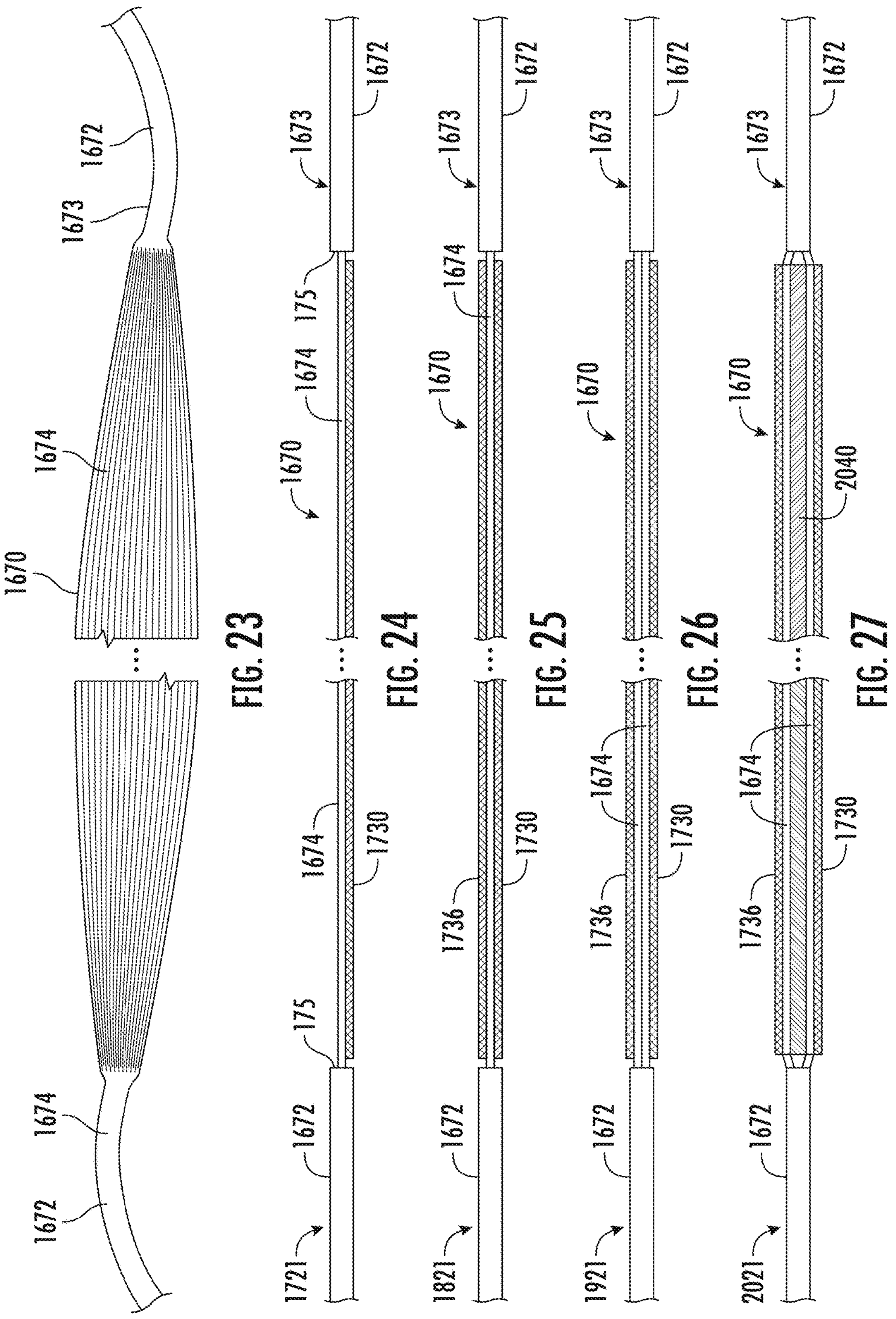
FIG. 23 is a front view illustrating portions of an example harness component of the example harness of FIG. 1.
FIG. 24 is a sectional view of an example harness component of the example harness of FIG. 1.
FIG. 25 is a sectional view of an example harness component of the example harness of FIG. 1.
FIG. 26 is a sectional view of an example harness component of the example harness of FIG. 1.
FIG. 27 is a sectional view of an example harness component of the example harness of FIG. 1.

FIG. 23 illustrates portions of an example harness component 1621 which may serve as waist belt 24 and/or either of leg loops 26 of harness 20 described above. Harness component 1621 comprises wideband portion 1670 and narrow extension portion 1672. Wideband portion 6070 and narrow extension portions 1672 are at least partially formed from a single continuous elongated tubular braid 1673. As shown by FIG. 23, the tubular braid 1672 has an oval or circular cross-sectional shape formed by the braided tension lines 1670 along the narrower extension portions 1672 and is flattened such that the tension lines 1674 are no longer braided but are spread apart in wideband portion 1670. In some implementations, tension lines 1670 are spread apart across the transverse width greater than the transverse width of narrower extension portions 1672. In some implementations, the tension lines 1670 are spread across a width that is at least twice the width/diameter of narrow extension portions 1672. The tension lines 1674 may be maintained in a spread apart configuration along wideband portion 6070 by any one of various manners described below with respect to FIGS. 26-27. The spread apart tension lines 1674 provide a greater surface area for providing greater comfort to the person wearing the harness component 1621 when the harness component 1621 is undergoing tension.

FIGS. 26-27 illustrate various example variations of harness component 1621 and various manners by which the tension lines 1674 may be maintained in a spread apart configuration along wideband portion 1670. FIG. 25 is a sectional view illustrating portions of harness component 1721. Harness component 1721 is similar to harness component 1621 except that harness component 1721 is illustrated as specifically comprising layer 1730 for retaining tension lines 1674 in the spread apart configuration shown in FIG. 24 along wideband portion 1670.

In the example illustrated, the tension lines 1674 of tubular braid 1673 are spread apart so as to extend in a single stratum such that each of the tension line 1674 is directly secured to the underlying layers 1730. Layers 1730 may be similar to layer 630 of harness component 621. Layers 1730 may continuously extend between ends 175 of the narrow extension portions 1670. Layer 1730 may be a fabric, a mesh or an imperforate layer of materials, such as a polymer. Layer 1730 may be inelastic, elastic, incompressible or compressible. Layer 7030 may comprise a solid layer or a foamed layer. Layer 1730 may be joined to tension lines 1674 by one or more stitch patterns, adhesives or by fusing (melting or laminating).

FIG. 25 is a sectional illustrating portions of harness component 1821. Harness component 1821 is similar to harness component 1721 except that harness component 1721 is illustrated as additionally comprising layer 1736 for retaining tension lines 1674 in the spread apart configuration shown in FIG. 23 along wideband portion 1670.

Layer 1736 may be similar to layer 634 of harness component 621. Layers 1736 may continuously extend between ends 175 of the narrow extension portions 1670. Layer 1736 may be a fabric, a mesh or an imperforate layer of materials, such as a polymer. Layer 1736 may be inelastic, elastic, incompressible or compressible. Layer 1736 may comprise a solid layer or a foamed layer. Layer 1736 may be joined to tension lines 1674 by one or more stitch patterns, adhesives or by fusing (melting or laminating).

FIG. 26 is a sectional illustrating portions of harness component 1921. Harness component 1921 is similar to harness component 1821 except that the tension lines 1674 of the tubular braid 1673 are spread apart to form two strata along wideband portion 1670. Layers 1730 and 1736 extend on opposite sides of the two strata and sandwich the two strata. Layer 1730 and 1736 may be joined to adjacent tension lines 1674 by one or more stitch patterns, adhesives and/or by fusing (melting or laminating). In some implementations, layers 1730 and 1736 are directly joined to one another, through the two strata of tension line 1674 by one or more stitch patterns, adhesives and/or by fusing (melting or laminating).

FIG. 27 is a sectional view illustrating portions of harness component 2021. Harness component 2021 is similar to harness component 1921 except that harness component 2021 additionally comprises middle layer 2040. In some implementations, layer 2040 may comprise a layer formed from a different material than that of layer 1730 or layer 1736. In some implementations, layer 2040 may comprise an elastomeric or resiliently flexible material. In some implementations, layer 2040 may comprise a compressible material, such as an open or closed cell foam material. Although illustrated as being thinner than layers 1730 and 1736, in some implementations, layer 2040 may be thicker than such layers. In some implementations, layer 2040 may be affixed to the two strata provided by tension lines 1674 by adhesives, stitching or fusing. In some implementations, layer 2040 may be loosely or movably positioned within and between the two strata of tension lines 1674. In some implementations, one or both of layers 1736 may be affixed to an adjacent stratum of tension line 1674. In some implementations, layer 2040 and one or both of layer 1730, 1736 may not be affixed to either or both of the two strata provided by tension lines 1674, wherein the transverse stiffness of layer 2040 maintains tension lines 1674 (in the form of a spread apart tubular braid) in a spread out or flattened state.

Figure 30:
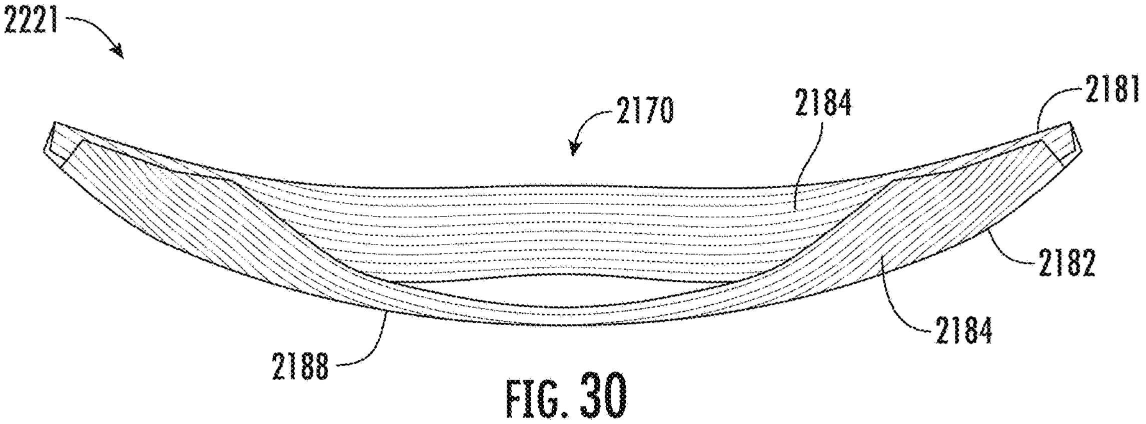
FIG. 30 is a top view illustrating upward folding of the bottom panel of FIG. 28.
Figure 31:
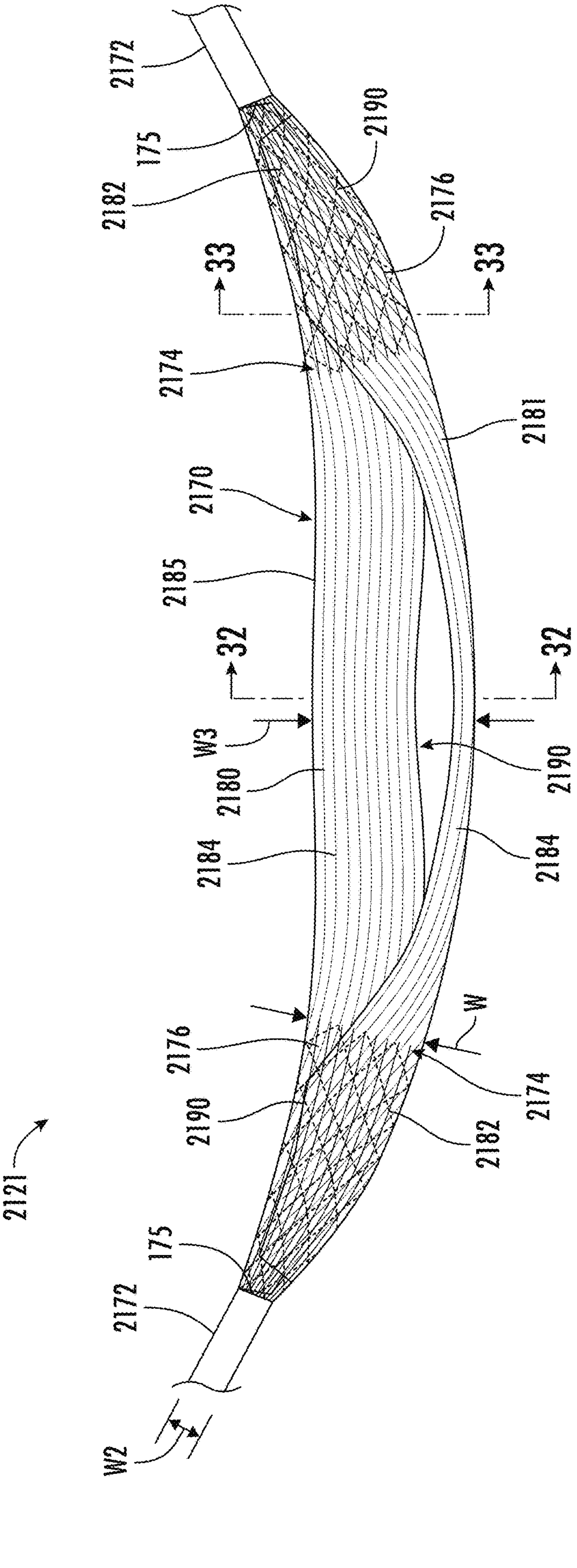
FIG. 31 is a top illustrating connection of narrow extension portions to opposite ends of the wideband portion of FIG. 30 to form the sample harness component of the example harness of FIG. 1.
Figure 32:
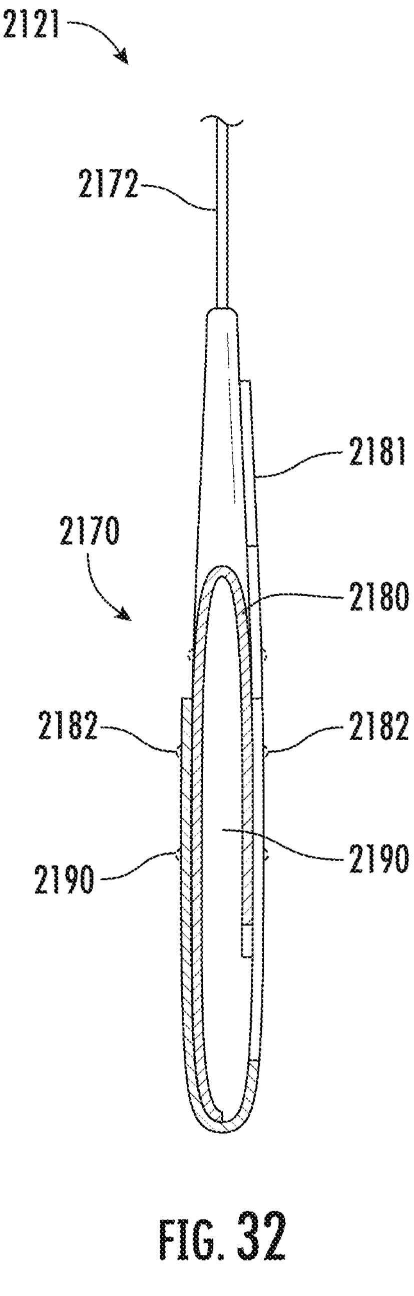
FIG. 32 is a sectional view of the harness component of FIG. 31 taken along line 32-32.
Figure 33:
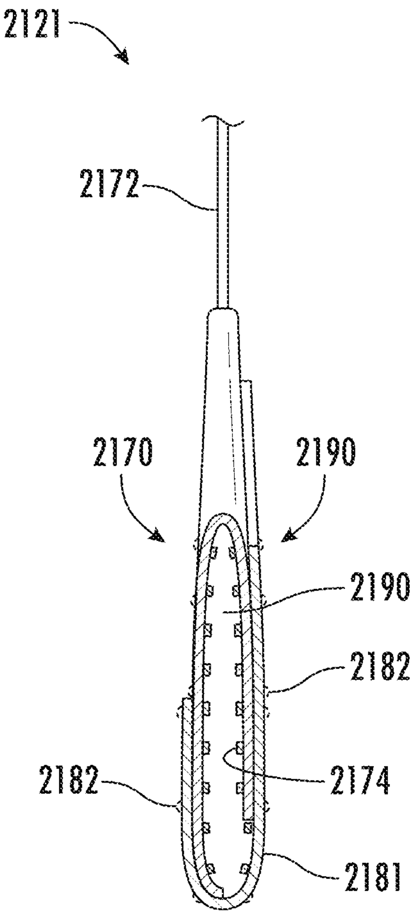
FIG. 33 is a sectional view of the harness component of FIG. 31 taken along line 33-33.

FIGS. 28-33 illustrate portions of an example harness component 2121. FIG. 28-31 illustrate an example method for forming the harness component shown in FIG. 31. FIGS. 32 and 33 sectional views of the harness component of FIG. 31 taken along the lines 32 and 33, respectively, of FIG. 31.

Figure 28:
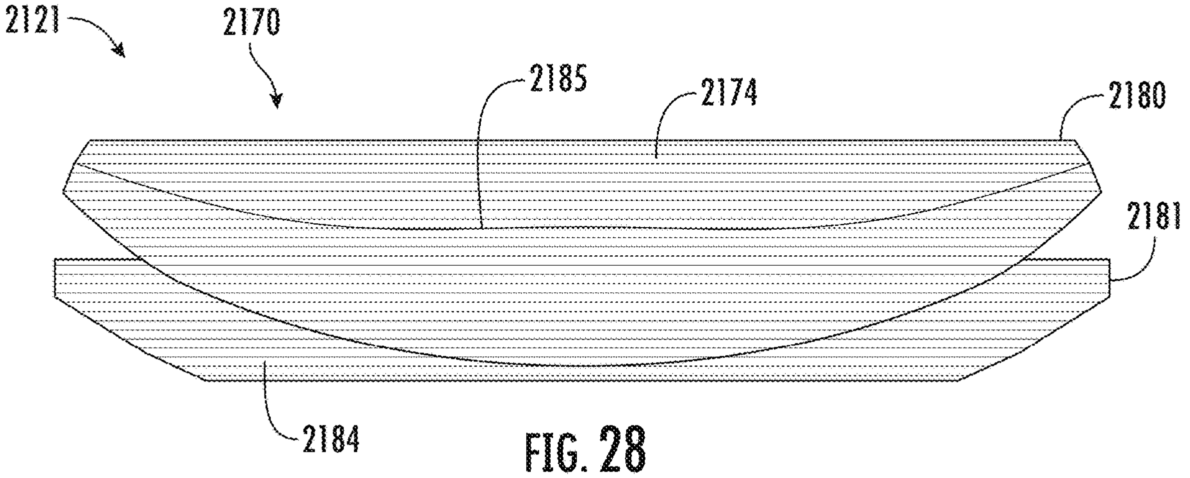
FIG. 28 is a top view illustrating overlapping top and bottom panels for forming an example wide band portion of an example harness component.
Figure 29:
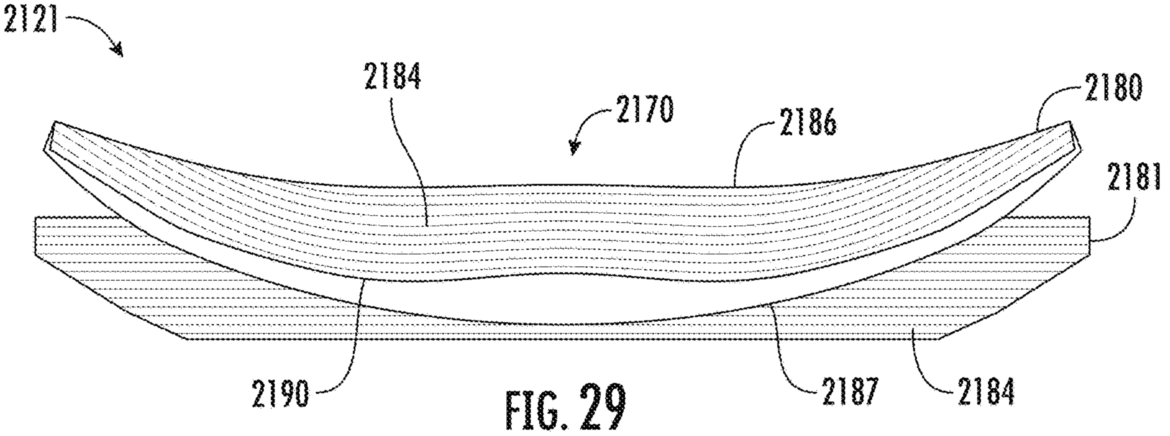
FIG. 29 is a top view illustrating downward folding of the top panel of FIG. 28.

FIGS. 28-30 illustrate an example method for forming the example wideband portion 2170 of the harness component 2121 shown in FIG. 31. Harness component 2121 may serve as waist belt 21 and/or either of leg loops 26 described above. As shown by FIG. 28, wideband portion 2170 is formed by panels 2180 and 2182. Each of panels 2180 and 2182 may comprise a fabric panel having tension lines 2184 in the form of longitudinal warp yarns. Panel 2181 is positioned so as to underly a portion of panel 2180 below and anticipated longitudinal fold line 2184. In one example implementation, panels 2180 and 2182 comprises 630 HT Denier warp for structure. In such implementations, panels 2180 and 2182 may comprise weft yarns. Such weft yarns may be 420 or 210 Denier with a looser density to provide bias give.

As shown by FIG. 29, panel 2180*s* folded along fold line 2185 to form the fold 2186. The fabric of panel 2180 is provided with sufficient bias shift so as to lay flat when folded as shown. In the example illustrated, when folded, panel 2180 has a crescent or banana-shape.

As shown by FIG. 30, those portions of panel 2181 extending below the lower edge 2187 of panel 2180 are folded upwardly along fold line 2188, the fold line 2188 matching the contour profile of edge 2187. As result, the downwardly folded panel 2180 the front having a downward facing interior) is nested within the upwardly folded panel 2181 having an upwardly facing interior that receives the folded panel 2181. In the example illustrated, the resulting inter-folded panels 2180 and 2182 have a crescent or banana-shape.

In the example illustrated, the two panels 2180 and 2182 are not affixed to one another but are merely inter-nested. In other implementations, panel 2180 and 2182 may be affixed to one another where such panels overlap (in FIG. 28). They may be affixed to one another by adhesives, fusing or stitches. In some implementations, a single panel having a shape similar to the overlapping panels 2180 and 2182 shown in FIG. 28 may be used to form the wideband portion 2170 of harness component 2121. In such an implementation, those portions of the single panel corresponding to those portions of panels 2180 and 2182 shown in FIG. 28 are folded in a similar fashion.

FIG. 31 illustrates the securement of narrow extension portions 2172 to the wideband portion 2170 formed in FIGS. 28-30. As shown by FIG. 31, each of narrow extension portions 2172 supports tension lines 2174 that are spread outwardly and project beyond the ends 175 to form splayed end portions 2176. Splayed end portions 2176 are received within the interior, downwardly facing pocket 2190 of the folded panel 2180. Splayed end portions 2176 are transversely spread across a width greater than the transverse width of narrow extension portions 2172. In some implementations, splayed end portions 2176 have a width W that is equal to or greater than two times the transverse width W2 of narrow extension portions 2172. Splayed end portions 2176 have a width W a spread across at least a majority of the maximum width W3 of wideband portion 2170 and, in some implementations, at least 90% of the maximum width W3 of wideband portion 2170. In the example illustrated, splayed end portions 2176 launched only extend along wideband portion 2172 two locations where the end portions of wideband portion 2170 are no longer undergoing substantial tapering towards narrow extension portions 2172.

In some implementations, each of narrow extension portions 2172 comprises a woven or braided band or cord of tension lines 2174, wherein splayed end portions 2176 are formed by at least partially unbraiding or unwinding the band or cord past ends 175 (similar to splayed end portions 1176 of FIG. 18). In some implementations, each of narrow extension portions 2172 comprises a sheath or tube (similar to tube 1394) containing and compacting tension lines 2174, wherein the sheet or tube ends at ends 175, permitting the tension lines 2174 to be spread apart and wherein the sheath or tube is affixed by stitching or the like to the tension lines 2174 extending through the sheath or tube.

Although tension lines 2174 are illustrated as spreading apart and having terminating ends, forming splayed end portions 2176 that are longitudinally spaced from one another at opposite end portions of wideband portion 2170, in other implementations, tension lines 2174 may have other configurations or lengths. For example, in some implementations, tension lines 2174 of both of narrow extension portions 2172 may be a single set of tension lines that are continuous and unbroken across an entire length of wideband portion 2170 (similar to tension lines 1384 of harness component 1321 or tension line 1674 of harness component 1621). In some implementations, the tension line 2174 of the two opposite narrow extension portion 2172 may remain distinct but may overlap with one another (similar to the overlapping tension lines 170 harness component 1121 described above).

As further shown by FIG. 31, harness component 2121 comprises tension line connectors 2190 which secure or join tension lines 2174 (whether the tension lines 2174 continues extends across an entire length of wideband portion 2170 or which terminate to form splayed end portions 2176) to the inter-folded panels 2180 and 2182 (or to the single folded panel in implementations where wideband portion 2170 is formed by a single folded panel). Tension line connectors 2190 facilitate the transmission of tension forces from the width W3 of wideband portion 2170 to the narrower extension portions 2172. Tension line connectors 2190 further assist in maintaining the spread apart arrangement of tension lines 2174. Although harness component 2121 is illustrated as comprising a pair of spaced tension line connectors 2190 correspond to the pair of spaced splayed end portions 2176, in those implementations where the splayed end portions 2176 overlap one another or where tension lines 2174 do not have end portions, but continuously extend across the full length of wideband portion 2170, harness component 2121 may a single tension line connector that extends across the full length of wideband portion 2170 or multiple distinct tension line connectors that collectively extend across the full length of wideband portion 2170 (with or without minor spacings or breaks between consecutive tension line connectors).

In the example illustrated, each of tension line connectors 2190 comprises a stitch pattern 2182 that extends across the width W and that extends across the tension lines 2174 spread across wideband portion 2170. Stitch pattern 2182 has a width equal to or greater than the width W. Stitch pattern 2182 has a width greater than the width W-2 of narrow extension portion 2172. Stitch pattern 2182 extends through panels 2180 and 2182 to join panels 2180 and 2182 and to secure the panels to tension lines 2174. In the example illustrated, stitch patterns 2182 are zigzag patterns. In other implementations, stitch patterns 2182 may have other configurations. In other implementations, those portions of tension lines 2174 that overlie wideband portion 2170 may be secured to panels 2180 and 2182 in other fashions such as with adhesives, fusing and the like.

Figure 34:
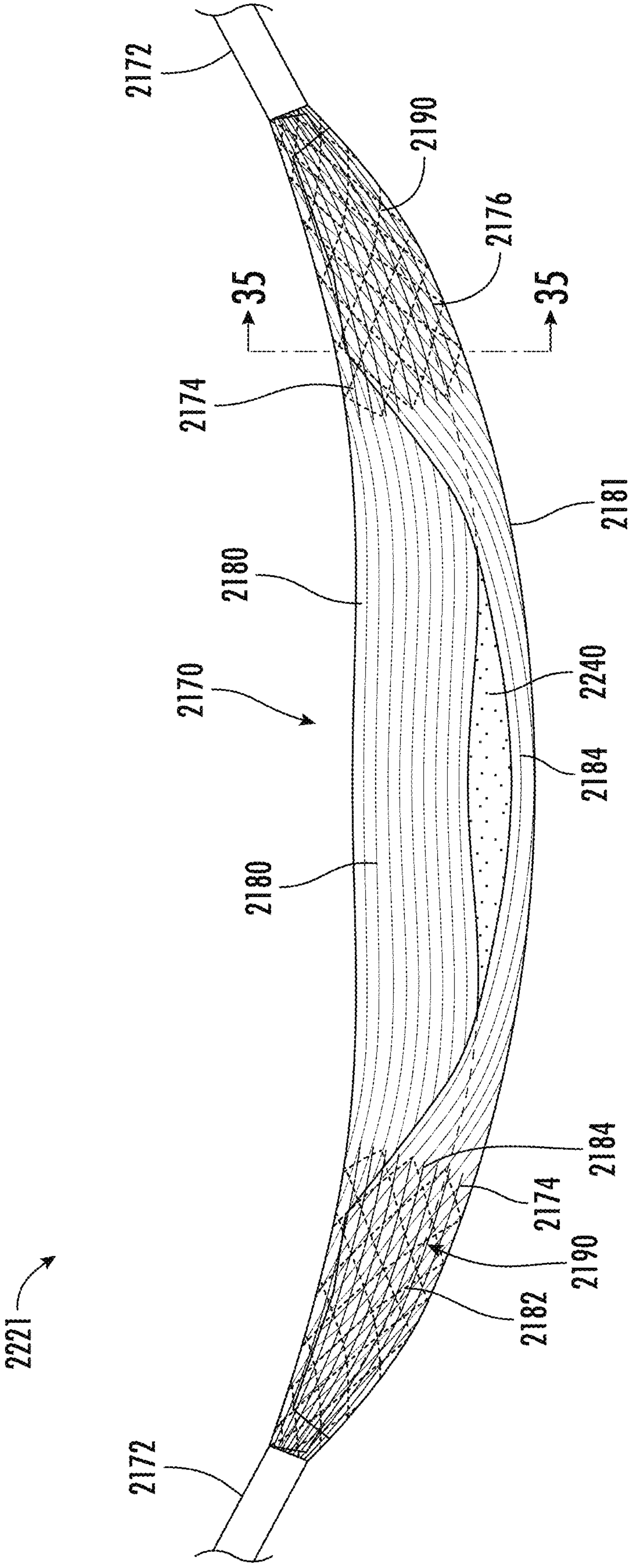
FIG. 34 is a top view of an example harness component of the example harness of FIG. 1
Figure 35:
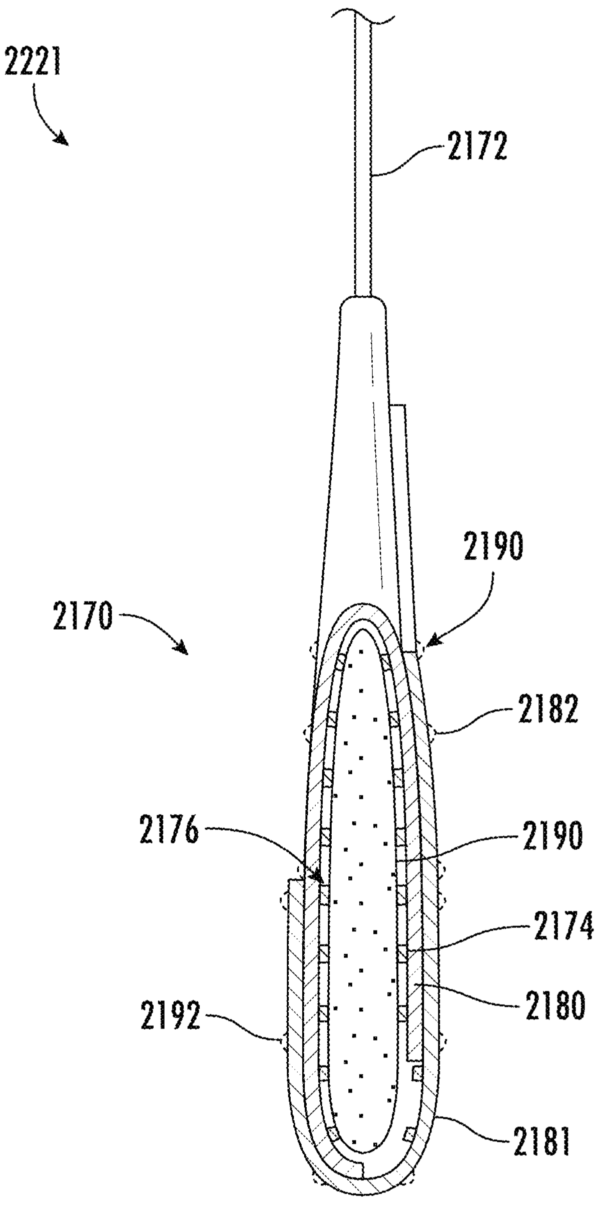
FIG. 35 is a sectional view of the example harness one of FIG. 34 taken along line 35-35.

FIGS. 34 and 35 illustrate portions of an example harness component 2221 which may serve as waist belt 21 and/or either of leg loops 26 described above. Harness component 2221 is similar to harness component 2121 except that harness component 2221 additionally comprises layer 2240. Layer 2240 is received within the interior cavity or pocket 2190 of the downwardly folded panel 2180. In the example illustrated, layer 2240 extends across a longitudinal midpoint and extends along a at least a majority of the longitudinal length of pocket 2190. In the example illustrated, layer 2240 extends along wideband portion 2170 in those regions between splayed end portions 2176 and in those regions where wideband portion 2170 is not undergoing substantial tapering towards narrow extension portions 2172. In some implementations, layer 2240 longitudinally extends into those regions having stitch pattern2182 such that stitch pattern 2182 also extends through layer 2240, securing layer 2240 in place.

In some implementations, layer 2240 comprises a pad or layer of a resiliently compressible material, such as a foam material, providing additional cushioning. In some implementations, layer 2240 comprises an uncompressible layer. In some implementations, layer 2240 is affixed to panel 2180 by adhesives, fusing, stitches or the like. In some implementations, layer 2240 comprises a separate physical pad structure. In some implementations, layer 2240 is free-floating (not attached or affixed to panel 2180) within pocket 2190. In some implementations, layer 2240 comprises a layer that is been sprayed, coated or injected (as a liquid) into pocket 2190. In some implementations, layer 2240 is flat and has a thickness of at least 0.5 millimeters.

Figure 36:
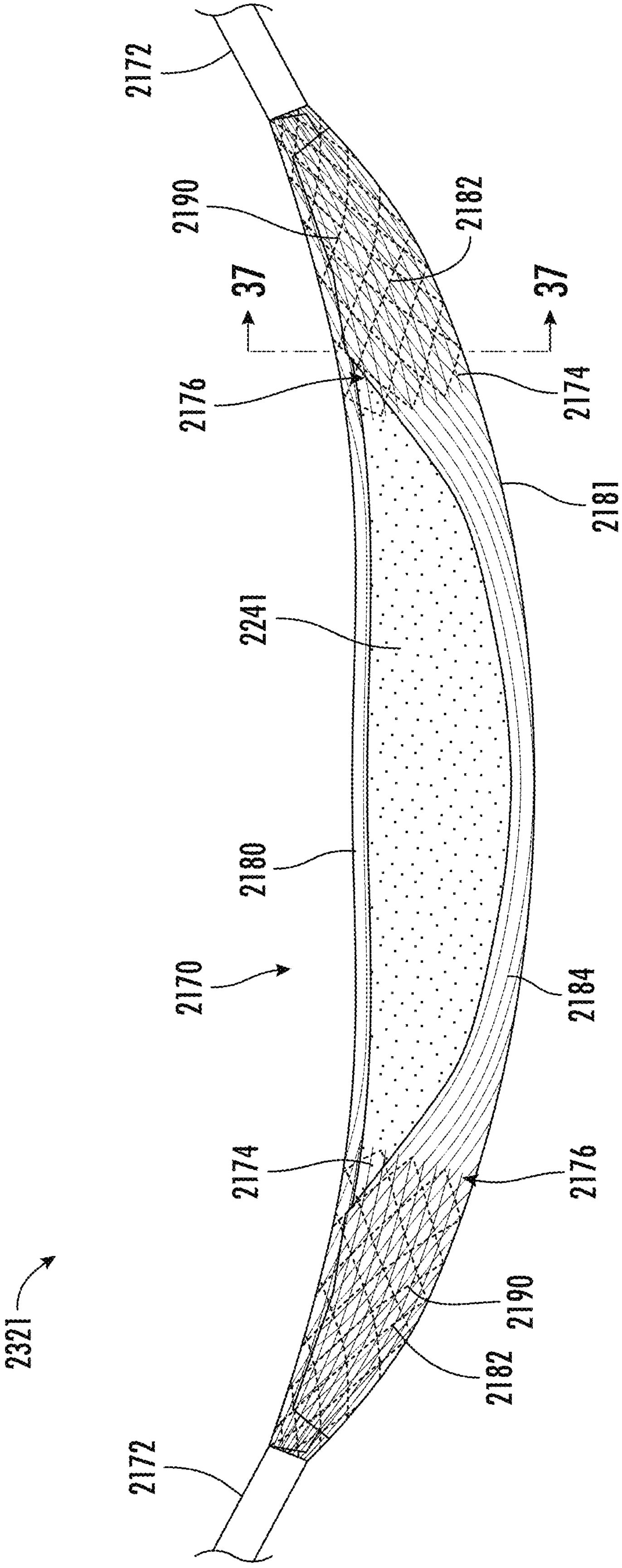
FIG. 36 is a top view of an example harness component of the example harness of FIG. 1
Figure 37:
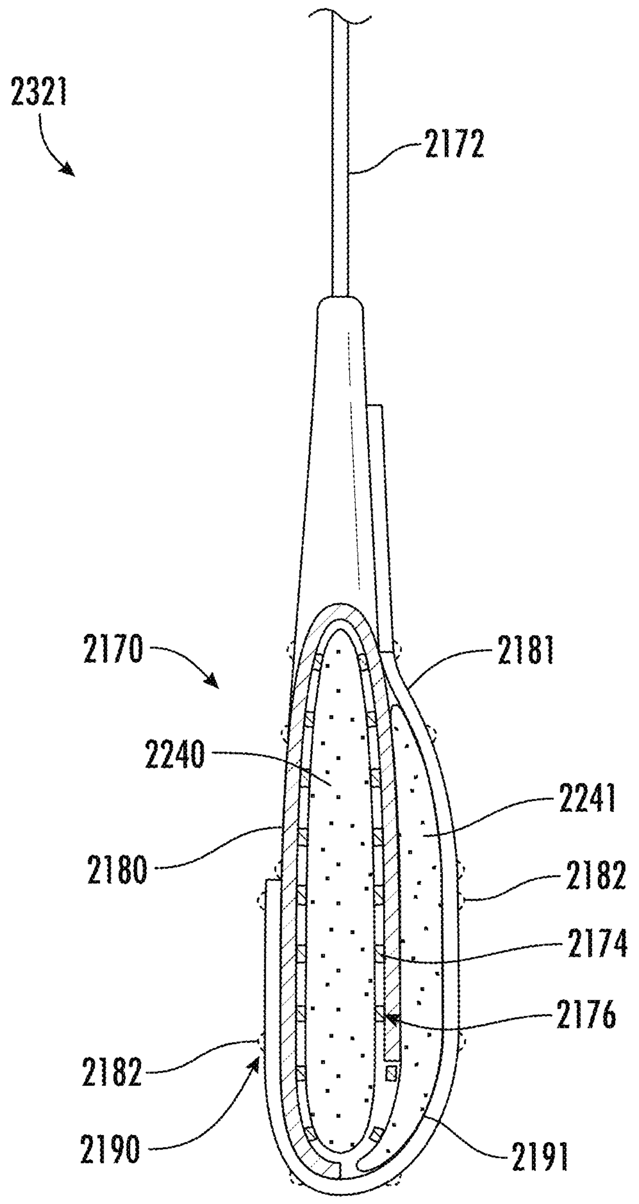
FIG. 37 is a sectional view of the example harness one of FIG. 34 taken along line 37-37.

FIGS. 36 and 37 illustrate portions of an example harness component 2321 which may serve as waist belt 21 and/or either of leg loops 26 described above. Harness component 2321 is similar to harness component 2221 and harness component 2121 described above except that component 2321 additionally comprises layer 2241. Layer 2241 is located between panels 2180 and 2181, within the upwardly facing pocket 2191 of the upwardly folded panel 2181. In the example illustrated, layer 2241 extends across a longitudinal midpoint and extends along a at least a majority of the longitudinal length of pocket 2190. In the example illustrated, layer 2241 extends along wideband portion 2170 in those regions between splayed end portions 2176 and in those regions where wideband portion 2170 is not undergoing substantial tapering towards narrow extension portions 2172. In some implementations, layer 2241 longitudinally extends into those regions 2182 such as stitch pattern 2182 also extends through layer 2241 for securing layer 2241 in place.

In some implementations, layer 2241 comprises a pad or layer of a resiliently compressible material, such as a foam material, providing additional cushioning. In some implementations, layer 2241 comprises an uncompressible layer. In some implementations, layer 2241 is affixed to panel 2180 by adhesives, fusing, stitches or the like. In some implementations, layer 2241 comprises a separate physical pattern structure. In some implementations, layer 2241 is free-floating (not attached or affixed to panel 2180) within pocket 2191. In some implementations, layer 2241 comprises a layer that is been sprayed, coated or injected (as a liquid) into pocket 2191. In some implementations, layer 2241 is flat and has a thickness of at least 0.5 mm or in some implementations 2 mm. In some implementations, harness component 2321 may omit layer 2240.

FIGS. 38-41 are sectional views illustrating various examples of different implementations of wideband portion 570 and tension line connector 590 which may be utilized for any of the harness components described above with respect to FIGS. 1A and 1B.

Figure 38:
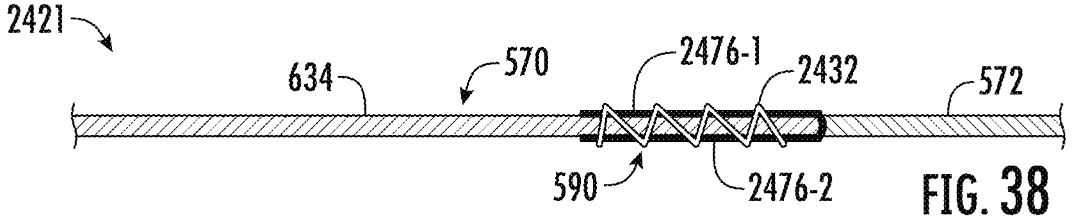
FIG. 38 is a sectional view illustrating portions of an example harness component.

FIG. 38 is a sectional view taken along line 7-7 of FIG. 6. FIG. 38 illustrates portions of an example harness component 2421, one implementation of harness component 521. Harness component 2421 is similar to harness component 621 except that component 2421 comprises splayed end portions 2476-1 and 2476-2 (collectively referred to as splayed end portions 2476) which extend from narrow extension portion 572. Splayed end portions 2476 extend on opposite faces and sandwich wideband portion 570 therebetween. Splayed end portions 2476 extend in different strata with layer 634 sandwiched therebetween. As with splayed end portions 176 and as illustrated by FIG. 6, splayed end portions 2426 spread out to a width W1 greater than the smaller width W2 of the narrow extension portion 572. Splayed end portions 2476 may extend across a majority of the transverse width of wideband portion 570, and in some implementations, at least 90% of the transverse width of wideband portion 570.

As described above with stitch pattern 632 and shown in FIG. 6, stitching pattern 2432 spreads out to or beyond the width W1 greater than the smaller width W2 of the narrow extension portion 572. Stitching pattern 2432 may extend across a majority of the transverse width of wideband portion 570. In some implementations, stitching pattern 2432 may extend across at least 90% of the transverse width of wideband portion 570.

Tension line connector 590 is in the form of a stitch pattern 2432 which extends across and through both of splayed end portions 2476 and through wideband portion 570. In some implementations, stitching pattern 2432 comprises a zigzag stitching pattern across a majority, if not substantially all of the entire transverse width of wideband portion 570. In other implementations, tension line connector 590 may additionally comprise adhesives or welds (the melting of either or both of wideband portion 570 and splayed end portions 2476) or the like. In some implementations, tension line connector 590 may omit stitch pattern 2432 and may comprise adhesives or welds connecting and securing splayed end portion 2476 to wideband portion 570.

Figure 39:
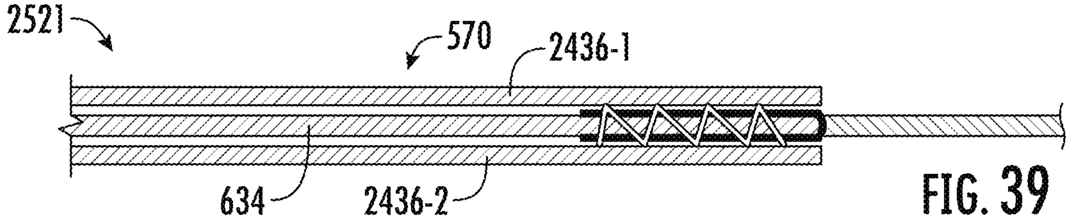
FIG. 39 is a sectional view illustrating portions of an example harness component.

FIG. 39 is a sectional view illustrating portions of an example harness component 2521. Harness component 2521 is similar to harness component 2421 except that harness component 2521 additionally comprises layers 2436-1 and 2436-2 (collectively referred to as layers 2436). Layers 2436 may comprise layers of foam, imperforate layers, layers of softer material or padding secured to layer 634, over the stitch pattern 2432 serving as tension line connector 590. Layers 2436 may be secured to layer 634 by additional stitching, adhesives, fusing or the like. Layers 2436 may be coated or otherwise deposited upon layers 634. In some implementations, one of layers 2436 may be omitted.

Figure 40:
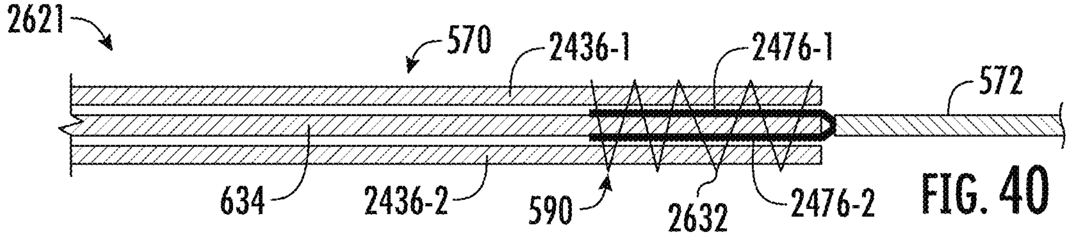
FIG. 40 is a sectional view illustrating portions of an example harness component.

FIG. 40 is a sectional view illustrating portions of an example harness component 2621. Harness component 2621 is similar to harness component 2521 except that harness component 2621 comprises a tension line connector 590 in the form of stitching pattern 2632. Stitching pattern 2632 is similar to stitching pattern 2432 and 632 except that stitching pattern 2632 comprises stitching that extends through both layers 2436 and through layer 634 across splayed end portions 2476. In some implementations, stitching pattern 2632 comprises a zigzag stitching pattern across a majority, if not substantially all of the entire transverse width of wideband portion 570. Stitching pattern 2432 spreads out to a width W1 greater than the smaller width W2 of the narrow extension portion 572. Stitching pattern 2432 may extend across a majority of the transverse width of wideband portion 570, and in some implementations, at least 90% of the transverse width of wideband portion 570.

Figure 41:
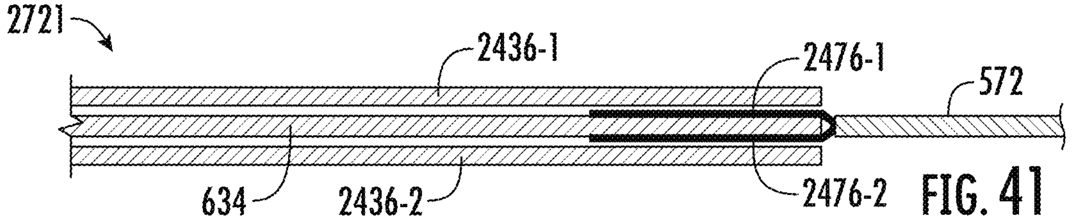
FIG. 41 is a sectional view illustrating portions of an example harness component.

FIG. 41 is a sectional view illustrating portions of an example harness component 2721. Harness component 2721 is similar to harness components 2521 and 2621 except that harness component 2721 omits a stitching pattern, wherein splayed end portions 2476 are laminated to and between layers 634 and layers 2436 by adhesives or fusing.

Figure 42:
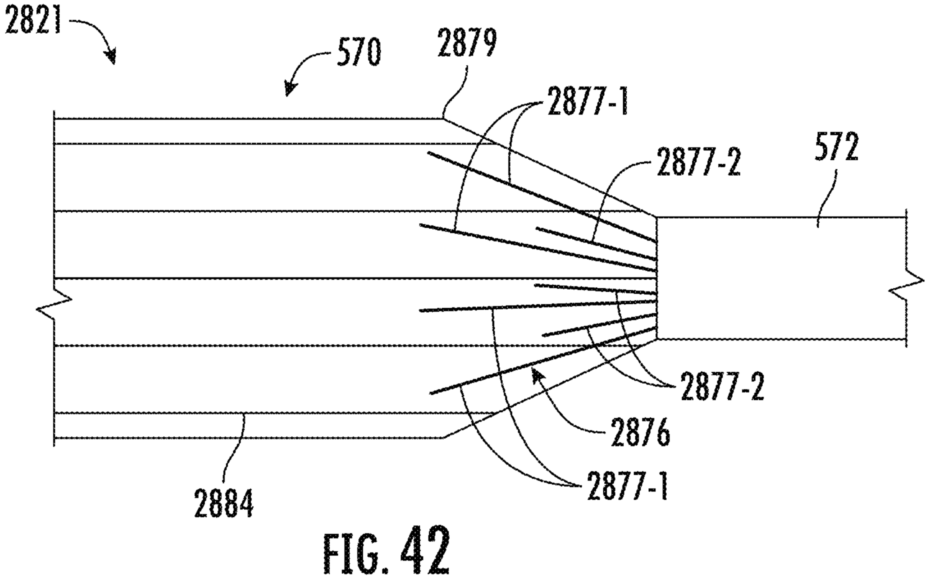
FIG. 42 is a top view schematically illustrating portions of an example harness component.

FIG. 42 is a diagram schematically illustrating a top portion of an example harness component 2821, sans the tension line connector 590 (whether in the form of a stitching pattern, adhesives or fusing) for purposes of illustration. Harness component 2821 may be utilized for any of the harness components described above with respect to FIGS. 1A and 1B. Moreover, the splayed end portions of any of the above-described harness components may alternatively have a configuration similar to the splayed end portion 2876 of the example harness component 2821 described below. Harness component 2821 may have any of the cross-sections described above with respect to FIG. 38-41.

FIG. 42 illustrates an example set of splayed end portions 2876 extending from narrow extension portion 572 and joined to the wideband portion 570 by the tension line connector 590 which is not illustrated in FIG. 42. FIG. 42 further illustrates example tension lines 2884 of wideband portion 570. For ease of illustration, only a portion of the total number of splayed end portions 2476 and a portion of tension lines 2884 are shown in FIG. 42.

As shown by FIG. 42, splayed end portion 2876 comprises splayed tension lines 2877-1 and 2877-2. Splayed tension lines 2877-1 have a length so as to extend to or beyond the location 2879 that wideband portion 570 begins to taper downwardly to the narrower width of narrow extension portion 572. Splayed tension lines 2877-2 have a length that is shorter than the length of splayed tension lines 2877-1. The provision of splayed tension lines 2877 having different lengths may provide enhanced load distribution.

In the example illustrated, splayed tension lines 2877-2 have a length that is less than or equal to one half the length of splayed tension lines 2877-1. In the example illustrated, splayed end portion 2876 has a uniform and equal distribution of splayed tension lines 2877-1 and splayed tension lines 2877-2. The number of splayed tension lines 2877-1 and 2877-2 are substantially equal. Likewise, splayed tension lines 2877-1 and splayed tension lines 2877-2 are uniformly spread across the transverse width of wideband portion 570. In other implementations, splayed tension lines 2877-1 and 2877-2 may have other different relative lengths, may have other relative numbers and may have other relative spreads or distributions across the transverse width of wideband portion 570.

FIGS. 43-46 illustrate portions of an example harness component 2921 which may be utilized for any of the harness components described above with respect to FIGS. 1A and 1B. Harness component 2921 comprises wideband portion 2970 and narrow extension portions 572. Wideband portion 2970 is similar to wide band 570 except that wideband portion 2970 is formed from an elastic triaxial braid tube or sleeve 2934 which is maintained in a stretched and flattened state to provide wideband portion 2970 with its width W1 which is greater than the width W-2 of narrow extension portions 572.

As described above, narrow extension portions 572 each comprise splayed end portions 176 or splayed end portions 2876 (shown in FIG. 46) which spread out across a majority, and in some implementations, at least 90%, of the transverse width W1 of wideband portion 2970. Splayed end portions 176/286 are received within the interior of the sleeve 2934 and are affixed or joined to the sleeve 2934 by a tension line connector 590 in the form of a stitch pattern 2932 which comprises lines of stitching that extends through and across one or both opposite faces of the flattened sleeve 2934. In other implementations, splayed end portions 176, 2876 may alternatively or additionally be affixed to tube 2934 by adhesives or fusing (the melting of the same or compatible materials of sleeve 2934 and splayed end portions 176, 276, or the melting of an added weld material that is compatible with both sleeve 2934 and splayed end portions 176, 2876).

Figure 45:
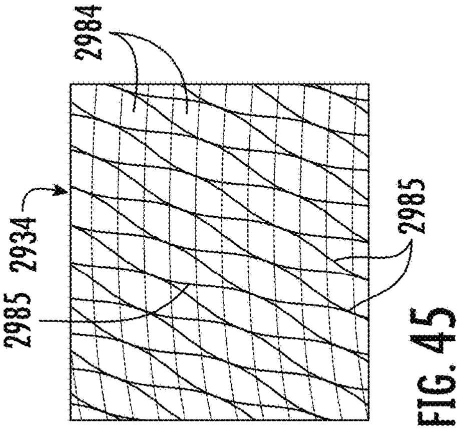
FIG. 45 is an enlarged perspective view illustrating the portions of the example wideband portion of FIG. 44 in a stretched state.
Figure 44:
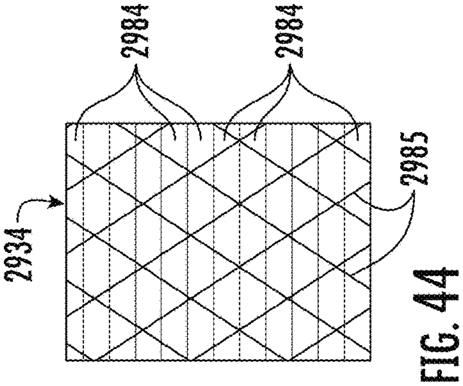
FIG. 44 is an enlarged perspective view illustrating portions of an example wide band portion of the example harness component of FIG. 43.

FIGS. 44 and 45 illustrate portions of an exterior of the example elastic braided sleeve 2934. FIG. 44 illustrates sleeve 2934 in an unstressed state. FIG. 45 illustrates sleeve 2934 in a stretched state. As shown by FIG. 44, sleeve 2934 comprises tension lines 2984 and binding lines 2985. Tension lines 2984 may be similar to tension lines 284 or 384 described above. Tension lines 2984 may be in the form of threads, yarns, cords or the like longitudinally extending along the length of wideband portion 2970. Tension lines 2984 longitudinally extend along substantially the entire length of wideband portion 2970. In some implementations, tension lines 2984 are inelastic in the longitudinal direction. In some implementations, tension lines 2984 may be elastic in the longitudinal direction. In some implementations, tension lines 2984 may have elasticity less than that of binding lines 2985. In some implementations, tension lines 2980 are formed from a high tensile strength material, such as nylon, polyester, ultra-high molecular weight yarns, liquid crystal polymers such as VECTRAN®, or other fibers. and have a Denier of at least 300.

Binding lines 2985 are interwoven tension lines 2984 and extends across a majority, if not all of the transverse width of sleeve 2934. Binding lines 2985 may be in the form of threads, yarns, cords or the like. Binding lines 2985 are elastic such that tension lines 2984 may be resiliently spread apart in the transverse direction and such that different longitudinal portions of sleeve 2934 may be transversely stretched to different extents to provide wideband portion 2934 with a varying transverse width across its length. In the example illustrated, sleeve 2934 is transversely stretched to a lesser extent at opposite end portions to provide wideband portion 2970 with end portions that taper towards narrow extension portions 572. In some implementations, binding lines 2985 are formed from an elastic material such as spandex. In other implementations, binding lines 2985 may be formed from other elastic materials.

As further shown by FIG. 44, in the example illustrated, binding lines 2985 alternately wrap over and wrap below consecutive tension lines 2984 as a transversely extend across the width of sleeve 2934. In the example illustrated, wideband portion 2970 comprises a first set of binding lines 2985 that extend in a first diagonal direction across tension lines 2984 (at approximately) 45°) and a second set of binding lines 2985 that extend in a second diagonal direction across tension line 2984 (approximate 90° relative to the first set of binding lines 2985). In the example illustrated, binding lines 2985 each have a diameter much less than that of tension lines 2984. In some implementations, the binding lines 2985 are bias yarns formed of a non-structural material, such as elastane fibers, spandex fibers and Lycra®, and the tension lines 2984 are longitudinal yarns formed of a high tensile strength material, such as nylon, polyester, ultra-high molecular weight yarns, liquid crystal polymers such as VECTRAN®, or other fibers. The reduced diameter of tension lines 2985 and the low density of tension lines 2985 provide sufficient elasticity for maintaining tension lines 2984 relative to one another during stretching while limiting the extent to which such tension lines 2984 add to the weight or bulk of tube 2934.

In other implementations, wideband portion 2970 may have a greater or fewer number of sets of binding lines 2985 at the same or at different angles relative to one another and/or relative to tension lines 2984. Such tension lines 2985 may have different relative diameters or thicknesses in different diameters or thicknesses relative to tension lines 2984. In other implementations, tension line 2984 may have other compositions or dimensions.

As shown by FIG. 45, in the flattened and stretched state, tension lines 2985 elastically elongate, permitting tension lines 2984 to spread apart to accommodate the wider width W1 of wideband portion 2970. In some implementations, sleeve 2934 is transversely stretched by at least 10% when forming wideband portion 2970. In other implementations, sleeve 2934 is transversely stretched by at least 30% when forming wideband portion 2970. Sleeve 2930 may be maintained in the stretched and flattened state in one or more various manners.

Figure 46:
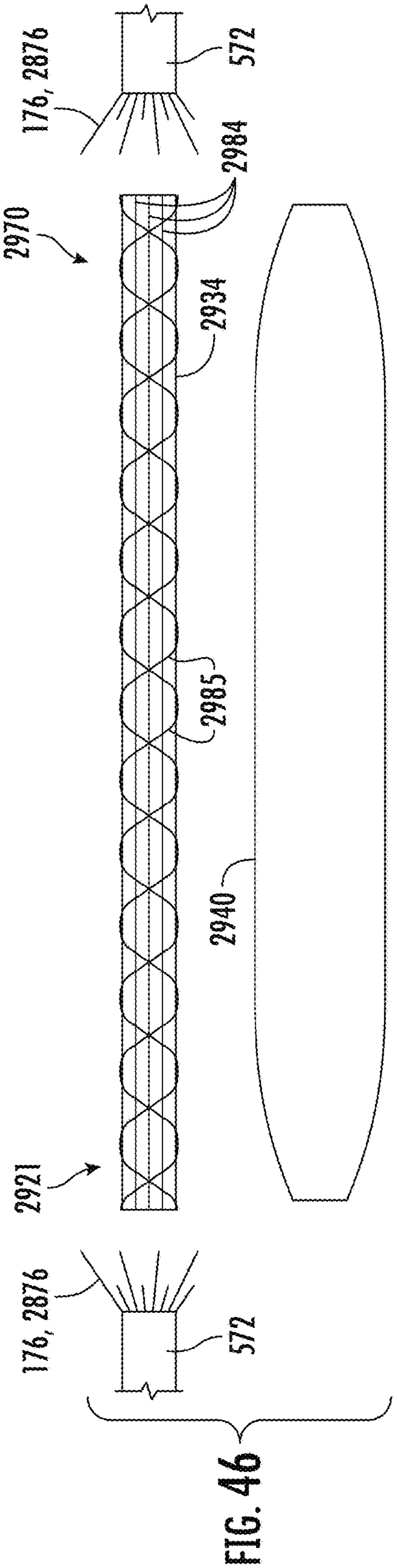
FIG. 46 is a top view schematically illustrating example components of the example harness component of FIG. 43.

FIG. 46 illustrates example components of harness component 2921. Harness component 2921 comprises narrower extension portions 572 (described above) and wideband portion 2970. Wideband portion 2970 comprises sleeve 2934 and shape retainer 2940. Sleeve 2934 is illustrated in an unstretched state in which sleeve 2934 may have a transverse width or diameter less than that of W1 (shown in FIG. 43). In some implementations, sleeve 2934 may have a diameter less than or equal to the width W2 of narrow extension portion 572. For ease of illustration, sleeve 2934 is schematically FIG. 46 with only a portion of tension lines 2980 for being illustrated and with a simplified representation of tension lines 2985.

Figure 43:
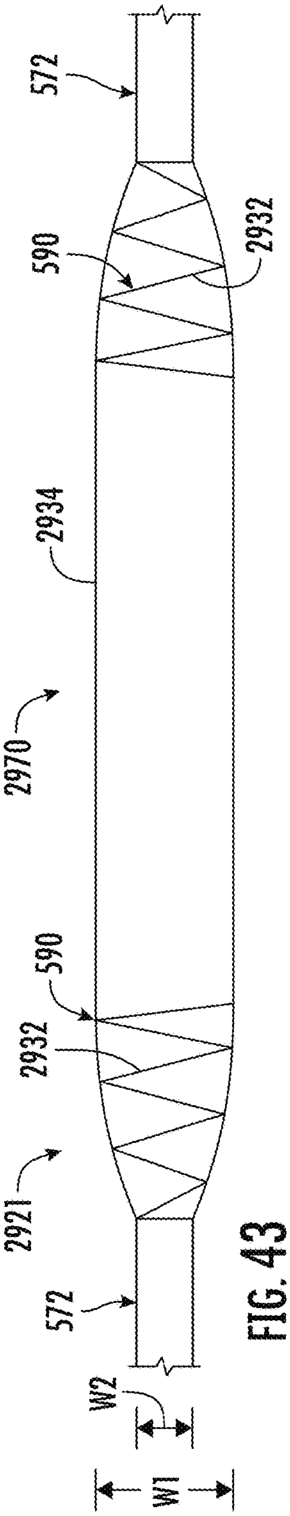
FIG. 43 is a top view illustrating portions of an example harness component.

Shape retainer 2940 comprises a layer configured to maintain sleeve 2934 in the stretched and flattened state shown in FIG. 43. In some implementations, shape retainer 2940 comprises a shaped insert that is inserted into the interior of sleeve 2934 and that is left within the interior of sleeve 2934 such as sleeve 2934 assumes the shape of the insert which correspond to the shape of wideband portion 2970 shown in FIG. 43. In implementations where shape retainer 2940 comprises an insert position within sleeve 2934, the insert may be exchanged at will to provide the wideband portion 2970 of harness component 2921 with any desired shape, any desired stretchability, any desired compressibility and/or any desired flexibility. The insert may be further replaced for repair or replacement.

In such implementations, the insert serving as shape retainer 2940 may be formed from a largely inelastic material such as a solid polymer panel or a foam panel. The insert serving as shape retainer 2940 may be flexible or bendable so as to be wrappable about the waste or a thigh of the person wearing harness component 2921. In some implementations, the insert serving as shape retainer 2940 may be elastic to some degree to accommodate differently sized waists or thighs. In some implementations, the insert serving as shape retainer 2940 may be in the form of a panel of a polymer, foam or the like. In other implementations, the insert may be formed from other materials. Although insert 2940 is illustrated as having an elongated oval shape with end portions that taper to more closely approximate the width of narrow extension portions 572, in other implementations, the insert serving as shape retainer 2940 may have other shapes and/or proportions.

In some implementations, shape retainer 2940 comprises one or more layers secured to an exterior of sleeve 2934 while sleeve 2934 is in the stretched and flattened state, wherein the one or more layers hold and retain sleeve 2934 in the stretched and flattened state. For example, in some implementations, an insert similar to that described above, may be inserted into sleeve 2934 to stretch and flatten sleeve 2934 to a desired shape, such as the shape shown in FIG. 43. The insert may be formed from material that may be chemically dissolved or which may be sufficiently brittle to be broken to facilitate its withdrawal from sleeve 2934 once sleeve 2934 is otherwise maintained in a stretched and flattened state by shape retainer 2940.

While the insert his position within sleeve 2934, the layer or layers serving as shape retainer 2940 are secured to an exterior of sleeve 2934 the exterior of sleeve 2934. The layer or layers may be in the form of a panel or panels that are bonded, stitched or fused to the flattened and stretched sleeve 2934. The layer or layers may be in the form of films or coatings applied to the exterior sleeve 2934, wherein the films or coatings, once cured or hardened, have sufficient thickness and stiffness so as to maintain sleeve 2934 in the flattened and stretched state. At such time, the insert defining the shape of sleeve 2934 may be withdrawn from the interior of sleeve 2934 or otherwise removed (chemical decomposition, breaking). Alternatively, the insert may be left within sleeve 2934. As with the insert serving as shape retainer 2940, the one or more layers serving as shape retainer 2940 may be formed from a largely inelastic material such as a solid polymer panel or a foam panel. The one or more layers serving as shape retainer 2940 may be flexible or bendable so as to be wrappable about the waist or a thigh of the person wearing harness component 2921. In some implementations, the one or more layers serving as shape retainer 2940 may be elastic to some degree to accommodate differently sized waists or thighs. In some implementations, the one or more layers serving as shape retainer 2940 may be in the form of a panel of a polymer, foam or the like. In other implementations, the one or more layers may be formed from other materials. Although the shape retainer 2940 is illustrated as having an elongated oval shape with end portions that taper to more closely approximate the width of narrow extension portions 572, in other implementations, the insert serving as shape retainer 2940 may have other shapes and/or proportions.

In some implementations, the one or more layers secured to the exterior of sleeve 2934 and serving as shape retainer 2940 may include additional longitudinally extending tension lines provide enhanced longitudinal strength for harness component 2921. For example, the one or more layers may be formed from a fabric cereal or the like having warp lines (threads, cords or the like) extending launched only across wideband portion 2970, wherein the tension line connector 590 (whether a stitch pattern 2932, an adhesive and/or a fusing) further secure such additional tension lines of shape retainer 2940 to the splayed end portions 176, 2876.

In some implementations, sleeve 2934 comprises a continuous sleeve having at least one open end. In some implementations, sleeve 2934 may include an elongate slit along is length facilitate the insertion and withdrawal of an insert, either for serving as shape retainer 2940 or for serving as a temporary mandrel for holding sleeve 2934 in a stretched flattened state while the one or more layers serving as shape retainer 2940 are applied to sleeve 2934. The elongate slit may extend along the entire length of sleeve 2934 or a portion of sleeve 2934; the elastic slit forming a mouth. The elongate slit may be surrounded by elastic portions so as to elastically close the mouth. In some implementations, the mouth formed by the elastic slit may be maintained in a closed state by connectors such as snaps, buttons, a zipper, or hook and loop fastener (hooks or one side of the slit in the loop portion on the other side of the slit).

Figure 47:
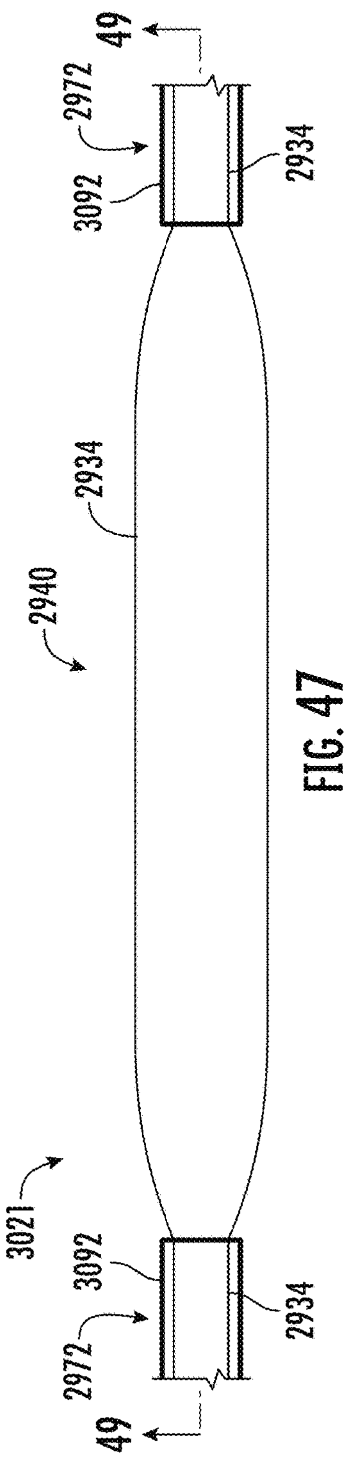
FIG. 47 is a top view illustrating portions of an example harness component.
Figure 48:
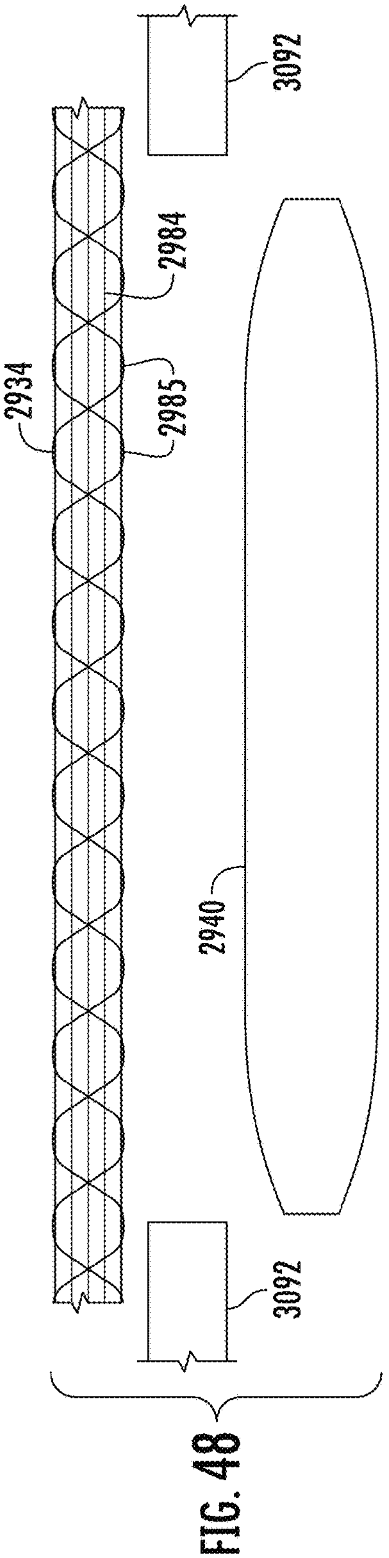
FIG. 48 is a top view schematically illustrating example components of the example harness component of FIG. 47.
Figure 49:
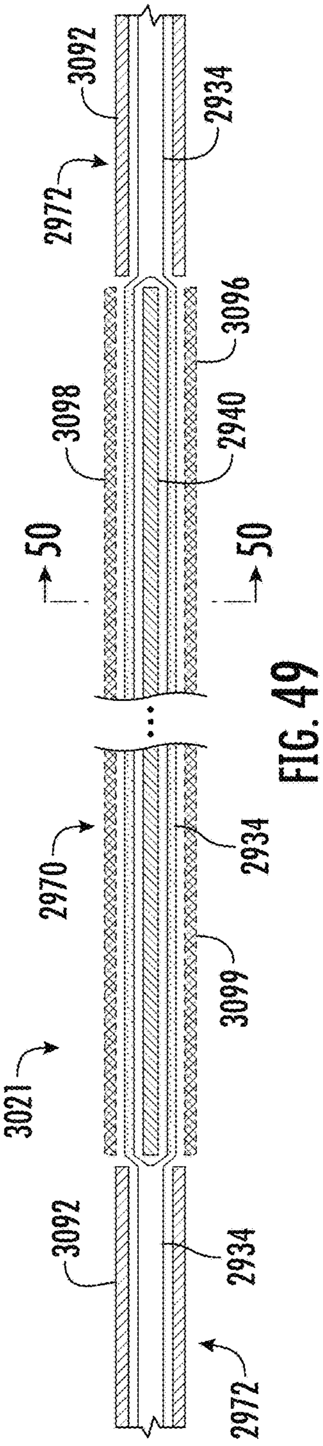
FIG. 49 is a sectional view of the example harness component of FIG. 47 taken along line 49-49.

FIGS. 47-49 illustrate portions of an example harness component 3021 which may be utilized for any of the harness components described above with respect to FIGS. 1A and 1B. Harness component 3021 is similar to harness component 2921 except that the sleeve 2934 forms portions of both wideband portion 2970 and narrow extension portions 2972. Harness component 3021 is similar to harness component 1321 described above in that tension lines 2984 of wideband portion 2970 continue beyond both ends of wideband portion 2972 serve as tension lines of narrow extension portions 2972. Binding lines 2985 elastically retain tension lines 2984 and a close compacted arrangement along narrow extension portions 2972, beyond shape retainer 2940.

As further shown by FIGS. 47-49, in the example illustrated, harness component 3021 may additionally comprise sheaths 3092 along narrow extension portions 2972. Sheaths 3092 comprise one or more layers that extend about and cover those portions of sleeve 2934 that provide narrow extension portions 2972. Sheaths 3092 protect portions of sleeve 2934 from abrasion, wherein damage. Sheaths 3092 are sufficiently flexible to accommodate the bending of the harness component 3021 as shown in FIGS. 1A and 1B. In some implementations, sheaths 3092 comprise separate tubes that receive portions of sleeve 2934. In some implementations, sheaths 3092 comprise coatings or films applied to those portions of sleeve 2934 that provide narrow extension portions 2972. In some implementations, sheaths 3092 may be omitted.

Figure 50:
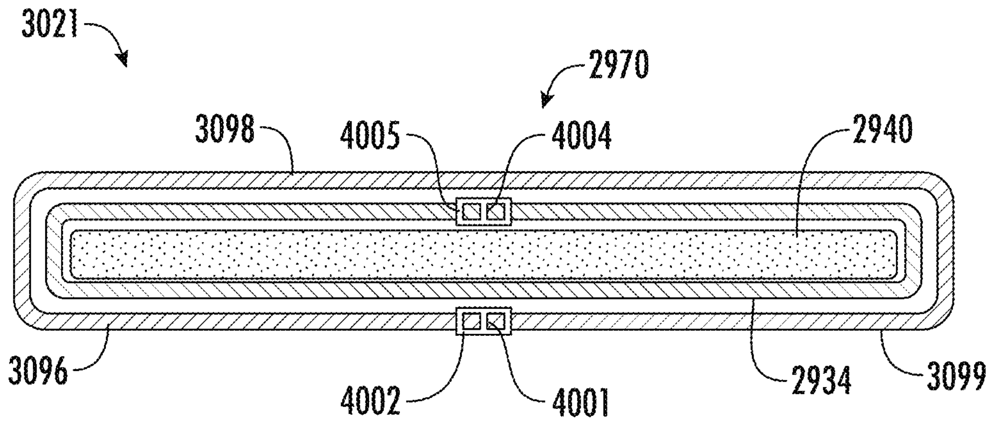
FIG. 50 is a sectional view of the harness component of FIG. 49 taken along line 50-50.

As shown by FIGS. 49 and 50, in the illustrated example, shape retainer 2940 is in the form of an insert position within sleeve 2934. The insert is retained within sleeve 2934. As further shown by broken lines in FIG. 49, in some implementations, wideband portion 2970 of harness component 3021 may additionally comprise outer layers 3096 and/or 3098. Outer layers 3096 and/or 3098 may be similar to layers 1396 and 1398 described above with respect to harness component 1521. Layers 3096, 3098 may comprise layers of foam, imperforate layers, perforate layers, layers of softer material or padding secured to the exterior sleeve 2934. Layers 3096, 3098 may provide wideband portion 2970 with the desired degree of smoothness, softness, or padding. Layers 3096 and 3098 may additionally protect sleeve 2934 from abrasion. Layers 3096, 3098 may be secured to sleeve 2934 by additional stitching, adhesives, fusing or the like. Layers 3096, 3098 may be coated upon sleeve 2934.

As shown by FIG. 50, layers 3096, 3098 may be provided by an outer tube or sleeve 3099 receiving sleeve 2934. The additional outer tube or sleeve 3099 providing layers 3096, 3098 may comprise a continuous sleeve having at least one opened axial end. In some implementations, as shown by FIG. 50, the additional outer tube or sleeve 3099 providing layers 3096, 3098 may include an elongate slit 4001 or mouth along its entire axial length to facilitate sideways positioning of the outer sleeve about the now inner sleeve 2934. The elongate slit 4001 may be bordered by a closing mechanism 4002 for releasably retaining slit 4001 in a closed state. In some implementations, closing mechanism 4002 may be in the form of elastic portions along slit 4001 so as to elastically close together. In some implementations, closing mechanism 4002 may comprise snaps, buttons, a zipper, or a hook and loop fastener (hooks or one side of the slit in the loop portion on the other side of the slit).

In the example shown in FIG. 50, sleeve 2934 is additionally provided with an elongate slit 4004 and a closing mechanism 4005. Slit 4004 has a length extending along the longitudinal length of wide band portion 2970. The slit has a sufficient length for the insertion of the insert serving as shape retainer 2940. The elongate slit 4004 is bordered by a closing mechanism 4002 for releasably retaining slit 4001 in a closed state. In some implementations, closing mechanism 4004 may be in the form of elastic portions along slit 4004 so as to elastically close together. In some implementations, closing mechanism 4004 may comprise snaps, buttons, a zipper, or a hook and loop fastener (hooks or one side of the slit in the loop portion on the other side of the slit).

Figure 51:
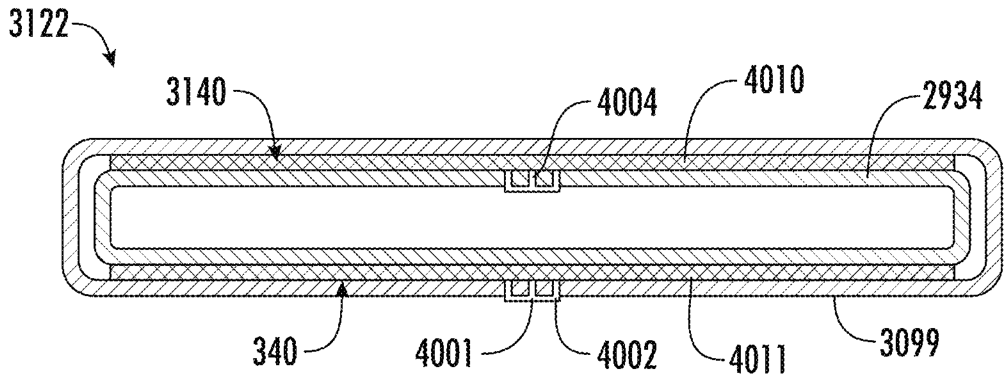
FIG. 51 is a sectional view of portions of an example harness component, a variation of the harness component of FIG. 49, taken along line 50-50 of FIG. 49.

FIG. 51 is a sectional view of portions of an example harness component 3121 taken along line 5-5 of FIG. 50. Harness component 3121 is similar to harness component 3021 except that harness component 3121 comprises a shape retainer 3140 in the form of layers 4010, 4011. Those remaining components of harness component 3021 which correspond to components of harness component 3021 are numbered similarly and such or are shown in FIGS. 49 and 50. As described above, sleeve 2934 comprises a slit 4004 to facilitate opening of sleeve 2934 for the insertion of an insert/mandrel (which may have the shape of shape retainer 2940 described above). The insert retain sleeve 2934 in a stretched and flattened shape. During such time, layers 4010 and 4011 may be applied to the exterior of the sleeve 2934. Layers 4010 and 4011 may comprise panels of material which are stitched, bonded or fused to the exterior of sleeve 2934. Layers 4010 and 4011 may comprise films or coatings applied to the exterior of sleeve 2934. Layers 4010 and 4011 have sufficient stiffness and structural configuration so as to maintain their shape and maintain the stretched and flattened shape sleeve 2934. Once the layers 4010 and 4011 have been secured to sleeve 2934 or once layers 4010, 4011 have been cured or hardened, slit 4004 may be opened and the/mandrel may be withdrawn. Although layers 4010, 4011 are illustrated as sides of the flattened sleeve 2934, in other implementations, layers 4010, 4011 may be formed as a single continuous layer that completely encircles or surrounds sleeve 2934. In some implementations, one of layers 4010, 4011 may be omitted.

In the example illustrated, similar to harness component 3021, harness component 3121 comprises outer sleeve 3099 (described above). Outer sleeve 3099 provide a softer, smoother texture over sleeve 2934 for those regions that are to contact the skin of the person wearing harness component 3122. Odyssey 3099 may further cover and protect sleeve 2934. In some implementations, outer sleeve 3099 may omit slit 4001, may have other configurations or may be omitted.

FIGS. 43-51 illustrate examples of a harness component comprising a tubular braid, wherein the tubular braid has a first end portion having a first density, a second end having a second density, and a central portion between the first end portion and the second end portion. The second portion has a third density less than the first density and less than the second density, wherein the central portion is flattened to form a face providing a surface area to confront an anatomy of a person wearing the harness component. In some implementations, the harness component may further comprise a layer formed upon the central portion. In some implementations, the first end portion and the second end portion each have a transverse width and wherein the central portion has a width greater than the transverse width. In some implementations, the tubular braid comprises lines or strands extending along at least three different axes. In some implementations, at least one of the axes extends along a longitudinal axis of the harness component. In some implementations, the strands that extend along the longitudinal axis have a first degree of elasticity and wherein the strands that do not extend along the longitudinal axis have a second degree of elasticity greater than the first degree of elasticity. In some implementations, opposite circumferential portions of the tubular braid forming the central portion are fixed to one another. In some implementations, the central portion is uncovered and perforate.

Figure 52:
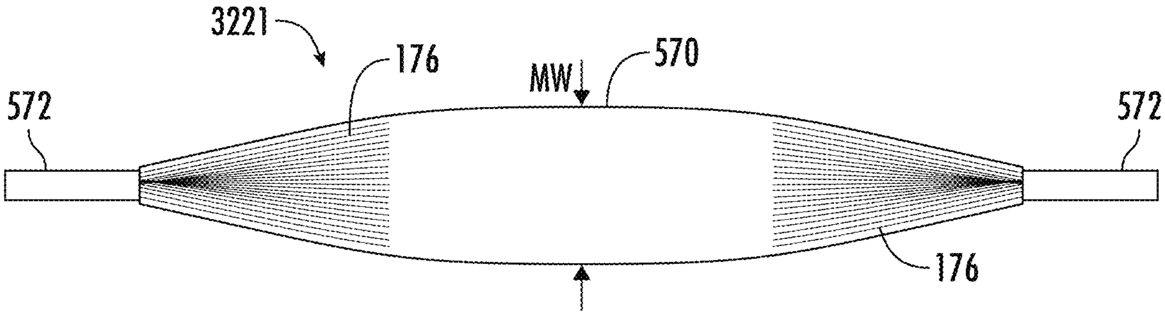
FIG. 52 is a front view illustrating portions of an example base harness component.
Figure 53:
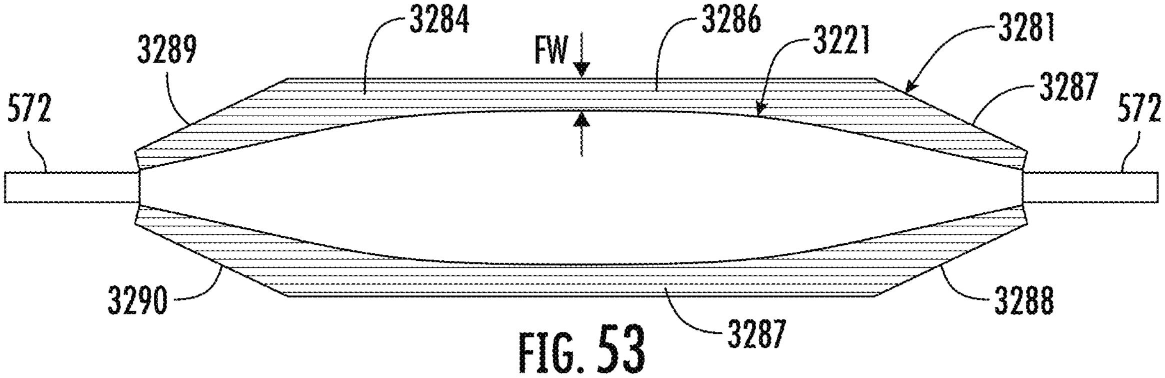
Figure 54:
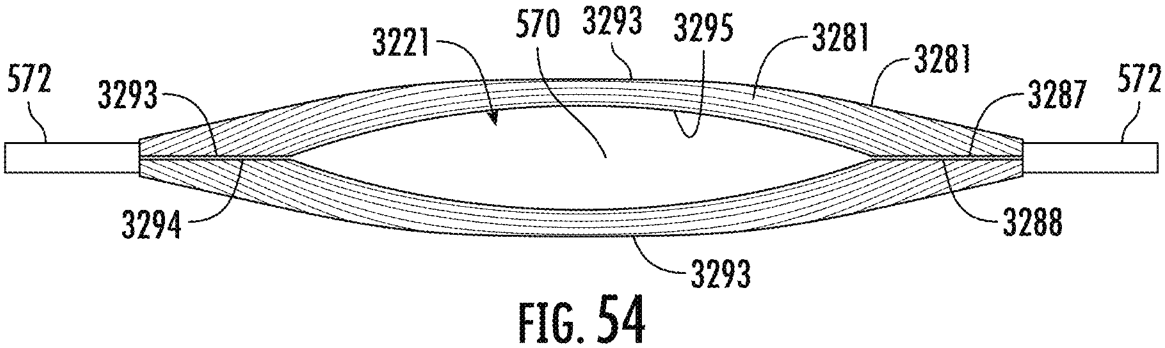
FIG. 54 is a front view illustrating portions of the example wrapping panel folded about the example base harness component.
Figure 55:
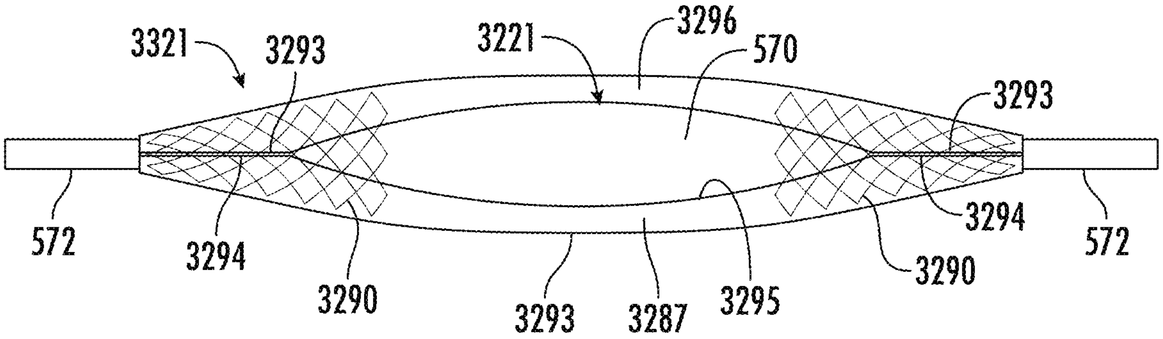
FIG. 55 is a front view illustrating securement of the folded example wrapping panel to the base harness component to form a wrapped harness component.

FIGS. 52-55 illustrate how the strength of a harness component may be supplemented or how the base harness component may be made from lighter and/or more compact materials when supplemented with additional strength. FIGS. 52-55 illustrate the formation of a wrapped harness component 3321 as shown in FIG. 55. FIG. 52 illustrates portions of a base harness component 3221. In the example illustrated, the base harness component 3221 is similar to harness component 521 described above with respect to at least FIG. 16, prior to the application of tension line connectors 590 on either end of wideband portion 570. As discussed above, in some implementations, wideband portion 570 may comprise tension lines 384 (shown in FIG. 6). In some implementations, wideband portion 570 may omit tension lines 384, such as where wideband portion 570 of base harness component 3221 comprises one or more layers of a polymer or other material lacking such tension lines.

As shown by FIG. 53, the base harness component 3221 is positioned over or on top of an underlying wrapping panel 3281. Panel 328 may have the same construction as that of panel 2181 described above. Panel 3281 comprises tension lines 3284 that run the longitudinal length of panel 3281. Panel 3281 is sized so as to extend beyond, above and below wideband portion 570 when underlying wideband portion 570. Panel 3281 is an upper foldable portion 3286 and a lower foldable portion 3287. Upper foldable portion 3286 and lower foldable portion 3287 have a foldable width FW. The size or extent of the foldable width FW may vary from what is shown. In some implementations, upper portion 3286 may have a different foldable width as compared to lower foldable portion 3287. In some implementations, the sum of the foldable widths FW of portions 3286 and 3287 are sized such that at least 20% of the maximum width MW of wideband portion 570 (shown in FIG. 52) is overlapped by portions 3286 and 3287 when folded over wideband portion 570 as shown in FIG. 54. In some implementations, portions 3286 and 3287 overlap greater extent, such as at least 40% of the maximum width MW of wideband portion 570.

FIG. 54 illustrates wrapping panel 3281 folded over and around the top and bottom edges of wideband portion 570. In some implementations, portion 3286 and 3287 are folded against and along the top and bottom side edges of wideband portion 570 such that when panel 3281 is folded about wideband portion 570, panel 3281 assumes the general shape of wideband portion 570. In some implementations, wrapping panel 3281 is folded along top and bottom for lines that are vertically spaced from the upper and lower side edges of wideband portion 570.

As shown by FIG. 54, wrapping panel 3281 is shaped and sized so as to overlap at least 80% of underlying portions of wideband portion 570 in those tapering portions of wideband portion 570 proximate to narrow extension portions 572. In the example illustrated, strength supplementing wrapping panel 3281 overlaps tapering portions of wideband portion 570 adjacent to narrow extension portions 572 by at least 95% in some implementations 100%. The large degree of overlap of those tapering portions of wideband portion 570 proximate to narrow extension portions 572 facilitates enhanced securement of panel 3281 to wideband portion 570 by tension line connectors 3290. In those implementations where wideband portion 570 comprises tension lines, the large degree of overlap by panel 3281 adjacent narrow extension portions 572 facilitates enhanced securement of such tension lines of wideband portion 570 to splayed end portions 176 (shown in FIG. 52) of narrow extension portions 572 for enhanced tension load transfer.

As further shown by FIGS. 53 and 54, the example wrapping panel 3281 may be provided with substantially straight tapering or angled edges 3293, 3294 that widen away from narrow extension portions 572 when panel 3281 underlies base harness component 3221. Tapering edges 3293, 3290 mirror one another and are shaped and sized such that when wrapping panel 3281 is folded as shown in FIG. 54, edges 3287, 3288 come into close proximity with one another. In the example illustrated, tapering edges 3293, 3294 may have but one another along a junction that is centered with respect to the width of narrow extension portions 572. As result, edges 3293, 3294 do not overlap to otherwise increase the thickness, but extends to sufficient proximity with one another for enhanced securement to wideband portion 570 adjacent narrow extension portions 572 by tension line connectors 3290 as shown in FIG. 55.

FIG. 55 illustrates the addition of tension line connectors 3290 at each end portion of wideband portion 570 proximate to narrow extension portions 572. Tension line connectors 3290 may be similar to tension line connectors 590 as described above. In the example illustrated, tension line connector 3290 may comprise stitching patterns that extends through folded over portions of panel 3281 and into or through wideband portion 570. Tension line connector 3290 may further extend over and across tapering end portions 176 (shown in FIG. 2). In other implementations, tension line connector 3290 may comprise adhesive layers, laminating layers or the like.

The above describe wrapping panel 3281 may be used with any of the other harness components described above to provide additional supplemental strength to the harness component. For example, wrapping panel 3281 may be utilized with any of harness component 621, 721, 821, 921, 1321, 1421, 1521, 1621, 1721, 1821, 1921, 2021, 2421, 2521, 2621, 2721, 2821, 2921, 3021 or 3122 which may serve as the base harness component about which the wrapping panel 3281 is folded and secured by tension line connector 3290. In some implementations, tension line connectors 3290 may be in addition to the existing tension line connectors described above with respect to such harness components.

In some implementations, an additional padding layer, water resistant layer, felt or other soft layer may be captured between wideband portion 570 and wrapping panel 3281, on either face of wideband portion 570. For example, the wrapped harness component shown in FIG. 55 may comprise layers 2240 or 2241 as described above captured between wideband portion 570 and wrapping panel 3281.

In some implementations, for even greater strength, a second wrapping panel, similar to wrapping panel 3281, may be wrapped about the arrangement shown in FIG. 54 in an opposite direction, wherein the second wrapping panel 3281 extends across and covers the opening 3295 (shown in FIG. 54) with its upper and lower portions 3286 and 3287 folding over edges 3293 and wrapping along the back side of what is shown in FIG. 54. Thereafter, the base harness component 3221 with the two oppositely facing and folded wrapping panels 3281 may all be joined to one another by tension line connectors 3290.

Figure 56:
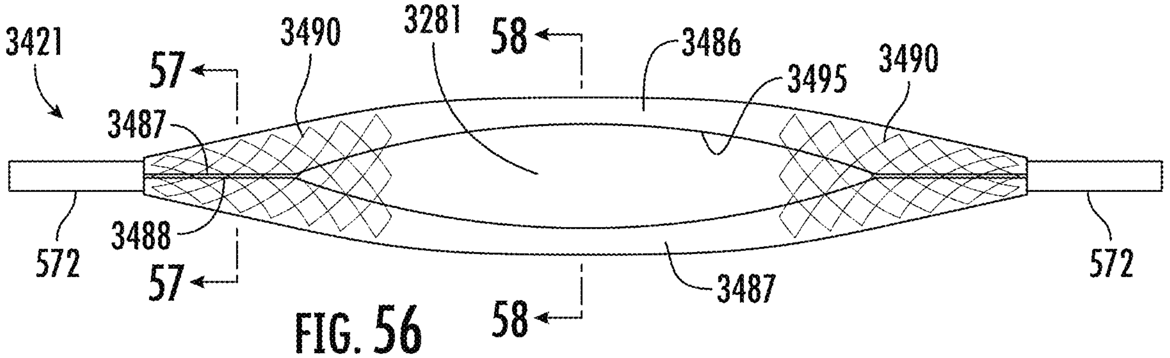
FIG. 56 front view illustrating portions of an example of a wrapped harness component.
Figure 57:
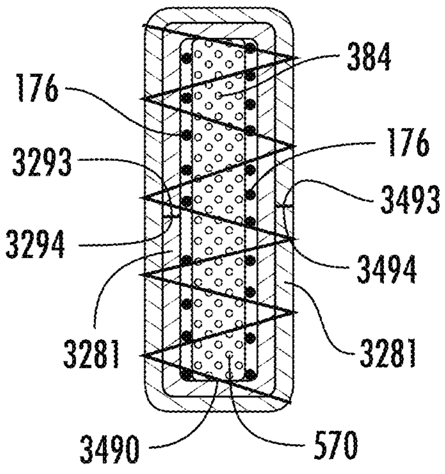
FIG. 57 the sectional view of the double wrapped harness component of FIG. 56 taken along line 57-57.

FIGS. 56-57 illustrate an example of such an implementation in the form of wrapped harness component 3421. Wrapped harness component 3421 is similar to wrap harness component 3321 except that wrapped harness component 3421 comprises an additional wrapping panel 3481 wrapped in an opposite direction as compared to wrapping panel 3281 and wrap harness component 3421 comprises a tension line connector 3490 that joins wrapping panel 3481 to at least the underlying wrapping panel 3281. As shown by FIG. 50, splayed end portions 176, extending from narrow extension portions 572, overlap opposite sides of wideband portion 570 which comprises its own tension lines 384. Wrapping layer 3281 wraps in a first direction about wideband portion 570, having abutting or closely positioned edges 3293, 3294. Wrapping panel 3481 wraps in an opposite direction as wrapping panel 3281 with its abutting or closely positioned edges 3493, 3494. In the example illustrated, tension line connector 3490 comprises a stitching pattern that extends through and across each of panels 3481, 3281, splayed end portions 176 and tension lines 384 of wideband portion 570, joining each of such structures to one another.

Figure 58:
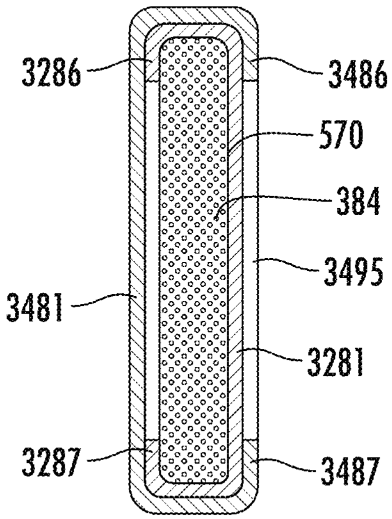
FIG. 58 is a sectional view of the double wrapped harness component of FIG. 56 taken along line 58-58.

FIG. 58 is a sectional view through a widest portion of wideband portion 570 of wrap harness component 3421. As shown by FIG. 58, the outermost wrapping panel 3481 comprises upper and lower portions that form the opening 3495. As shown by FIGS. 56-58, in some implementations, wideband portion 570 may have a nonuniform thickness along its longitudinal length. For example, wideband portion 570 may have a greater thickness in central portions of wideband portion 570, between tension line connectors 3490 and may have a narrow or with those regions below are adjacent tension line connectors 3490 and adjacent to narrow extension portions 572. In some implementations, wideband portion 570 may have a nonuniform transverse thickness. As noted above, in some implementations, wideband portion 570 may omit tension lines 384. As described above, in some implementations, tension line connectors 176 mixed on one side of wideband portion 570 rather than extending into strata, sandwiching wideband portion 570.

In some implementations, wrapping panel 3281 may be the wrapped about shaping retainer 2940 described above (in a fashion similar to that shown in FIG. 54) prior to the wrapped shape retainer 2940 being received within the elastic triaxial braid tube or sleeve 2934 described above. Once the wrapped shape retainer 2940 is received within elastic triaxial braid tube or sleeve 2934, tension line connectors 590 may be applied to secure the tension lines of the splayed end portions 2876 (described above), the tension lines of the elastic triaxial braid tube or sleeve 2934, and the tension lines of the wrapping panel 3281 to one another.

Figure 59:
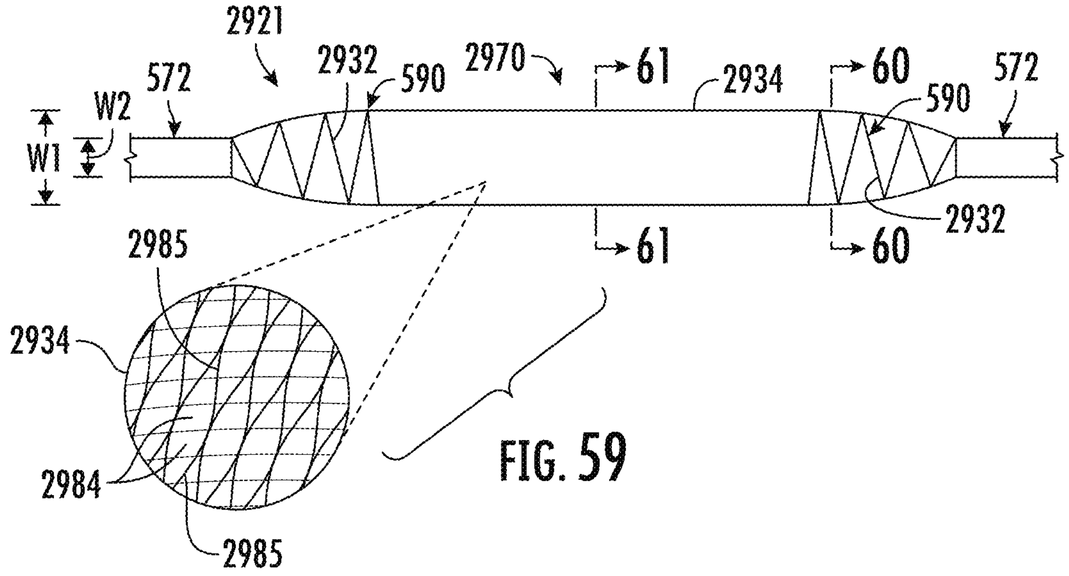
FIG. 59 is a front view illustrating portions of an example double wrapped harness component with the tubular braid.
Figure 60:
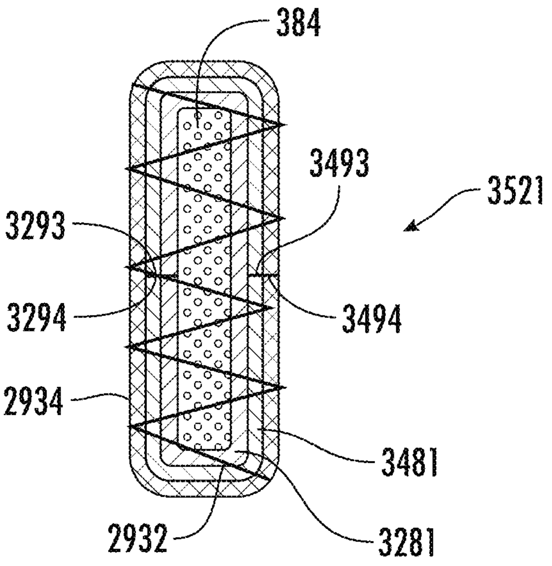
FIG. 60 is a sectional view of the example double wrapped harness component of FIG. 59 taken along line 60-60.
Figure 61:
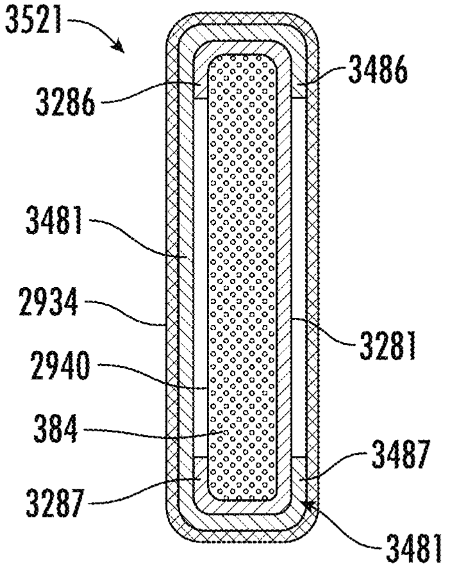
FIG. 61 is a sectional view of the example double wrapped harness component of FIG. 59 taken along line 61-61.

FIGS. 59-61 illustrate an example of such an implementation in the form of wrapped harness component 3521. Harness component 3521 is similar to harness component 3021 (described above with respect to FIGS. 48-50) except that wrapping panels 3281 and 3481 (described above with respect to harness component 3421) wrap about shape retainer 2940 in a fashion similar to the way they wrap about wideband portion 570. Those components of wrap harness component 3521 which correspond to components of harness component 3021 and/are harness component 3421 are numbered similarly. In some implementations, the outermost wrapping panel 3481 may be omitted. In some implementations, shape retainer 2940 may have a shaping construction similar to that of wideband portion 570 of wrap harness component 3421. For example, shape retainer 2940 may comprise tension lines 384 as shown, wherein the tension line connectors 2932 extends through shape retainer 2940 and over and across tension line connectors 384. In some implementations, upon securement of wrapping panels 3281, 3481 (when provided) and sleeve 2934, such as with lamination, stitching or the like, shape retainer 2940 may be removed or withdrawn. In some implementations, wrap correspond 3521 may include sheets 3092 and/or layers 3098, 3099 as shown in FIG. 49. In some implementations, harness component 3521 may have a configuration similar to that described above with respect to harness component 2921, wherein splayed end portions 2876 are joined to sleeve 2934.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms “first”, “second”, “third” and so on in the claims merely distinguish different elements and, unless otherwise stated, are not to be specifically associated with a particular order or particular numbering of elements in the disclosure.

What is claimed is:

1. A harness component comprising:
- a wide band portion comprising:
  - a sleeve comprising:
    - longitudinal tension lines; and
    - elastic binding lines transversely extending across the longitudinally extending lines; and
  - a shape retainer connected to the sleeve and retaining at least portions of the sleeve in a stretched and flattened state; and
  - a narrow extension portion extending from the wideband portion and comprising tension lines connected to the longitudinal tension lines of the sleeve.

2. The harness component of claim 1, wherein the shape retainer comprises an insert within the sleeve.

3. The harness component of claim 2 further comprising a wrapping panel wrapped about the insert.

4. The harness component of claim 1, wherein the shape retainer comprises a layer affixed to an exterior of the sleeve.

5. The harness component of claim 4, wherein the shape retainer comprises a shape retaining film impregnating the sleeve.

6. The harness component of claim 1, wherein the narrow extension portion has a first width and wherein the shape retainer has a second width greater than the first width.

7. The harness component of claim 1, wherein the sleeve comprises an elongate slit.

8. The harness component of claim 1, wherein the harness component further comprises a closing mechanism along the elongate slit.

9. The harness component of claim 1, further comprising an outer sleeve receiving the sleeve.

10. The harness component of claim 9, wherein the outer sleeve comprises an elongate slit.

11. The harness component of claim 10, wherein the harness component further comprises a closing mechanism along the elongated slit.

12. The harness component of claim 1, wherein the sleeve extends along and forms a part of the narrow extension portion.

13. The harness component of claim 12 further comprising a sheath covering portions of the sleeve that forms the part of the narrow extension portion.

14. The harness component of claim 1, wherein the shape retainer retains the sleeve in an elongated oval shape having tapered ends.

15. The harness component of claim 1, wherein the narrow extension 2 portion has a first width and comprises a splayed end portion spread across a second width of the sleeve, the second width being greater than the first width.

16. The harness component of claim 15, wherein the splayed end portion comprises first splayed tension lines having a first length and second splayed tension lines having a second length different than the first length.

17. The harness component of claim 15, wherein the splayed end portion is connected to the sleeve.

18. The harness component of claim 17 further comprising a stitch pattern joining the splayed end portion to the sleeve.

19. The harness component of claim 1, wherein the elastic binding lines extend along at least two different non-longitudinal axes.

20. The harness component of claim 1, wherein longitudinal tension lines have a first degree of elasticity and wherein the elastic binding lines have a second degree of elasticity greater than the first degree of elasticity.

* * * * *